United States Patent
Park et al.

(10) Patent No.: US 12,493,548 B2
(45) Date of Patent: Dec. 9, 2025

(54) MEMORY DEVICE REDUCING I/O SIGNAL LINES THROUGH I/O MAPPING CONNECTION AND MEMORY SYSTEM INCLUDING THE SAME

(71) Applicant: Samsung Electronics Co., Ltd., Suwon-si (KR)

(72) Inventors: Sang-Won Park, Suwon-si (KR); Jooyong Park, Suwon-si (KR); Seokmin Yoon, Suwon-si (KR); Bongsoon Lim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 183 days.

(21) Appl. No.: 18/454,293

(22) Filed: Aug. 23, 2023

(65) Prior Publication Data

US 2024/0232066 A1 Jul. 11, 2024

(30) Foreign Application Priority Data

Jan. 5, 2023 (KR) .................... 10-2023-0001537

(51) Int. Cl.
 *G06F 12/02* (2006.01)
 *G06F 13/16* (2006.01)
(52) U.S. Cl.
 CPC ........ *G06F 12/023* (2013.01); *G06F 13/1668* (2013.01)
(58) Field of Classification Search
 CPC ............... G06F 12/023; G06F 13/1668; G06F 13/4239; G06F 3/0658; G06F 3/0659;
 (Continued)

(56) References Cited

U.S. PATENT DOCUMENTS

| 8,700,961 B2 | 4/2014 | Lassa et al. |
| 9,009,400 B2 * | 4/2015 | Ware .................. G11C 5/02 711/105 |

(Continued)

FOREIGN PATENT DOCUMENTS

CN 111599388 A 8/2020

OTHER PUBLICATIONS

Extended European Search Report dated Apr. 29, 2024 for corresponding European Application No. 23209765.9.

(Continued)

*Primary Examiner* — Xiaochun L Chen
(74) *Attorney, Agent, or Firm* — Harness, Dickey & Pierce, P.L.C.

(57) ABSTRACT

Disclosed is a memory system including a memory device and a memory controller. The memory device includes a package of a first memory chip configured to receive input/output signals through first input/output pads and a second memory chip having second input/output pads connected to the first input/output pads by a mapping connection. The memory controller configured to provide the input/output signals to the memory device. The second memory chip is configured to receive input/output signals different from the input/output signals provided by the memory controller to the first memory chip due to the mapping connection. The first and second memory chips are configured to selectively ignore the input/output signals provided by the memory controller based on the mapping connection.

20 Claims, 17 Drawing Sheets

(58) Field of Classification Search
CPC ..... G11C 5/04; G11C 2207/105; G11C 16/12; G11C 16/08; G11C 16/14
See application file for complete search history.

(56) References Cited

U.S. PATENT DOCUMENTS

| | | |
|---|---|---|
| 9,117,504 B2 | 8/2015 | Grunzke |
| 9,928,006 B2 | 3/2018 | Kim et al. |
| 9,933,980 B2 | 4/2018 | Law |
| 10,289,597 B2 | 5/2019 | Rivers et al. |
| 10,379,753 B2 | 8/2019 | Chen et al. |
| 10,468,073 B2 | 11/2019 | Contreras et al. |
| 2014/0104935 A1 | 4/2014 | Ware et al. |
| 2019/0088622 A1 | 3/2019 | Suzuki et al. |
| 2021/0303484 A1 | 9/2021 | Vaysman et al. |
| 2022/0139432 A1 | 5/2022 | Shin et al. |
| 2024/0331744 A1* | 10/2024 | Jo .......................... G11C 7/222 |

OTHER PUBLICATIONS

Hynix Semiconductor et al: "Open NAND Flash Interface Specification, Revision 1.0 28—Dec. 2005" pp. 1-106.

* cited by examiner

FIG.5

| Condition | CE# | CLE | ALE | WE# | RE# | Description |
|---|---|---|---|---|---|---|
| - | H | X | X | X | X | Standby |
| #1 | L | H | L | ↱ | H | Latch Command |
| #2 | L | L | H | ↱ | H | Latch Address |
| #3 | L | L | L | ↱ | H | Latch Data |

H: High Level, L: Low Level, X: Do not care, ↱ : Rising edge

FIG.6

| Command | 1st Cycle | 2nd Cycle | Note |
|---|---|---|---|
| Read | 00h | 30h | Read Operation |
| Program | 80h | 10h | Program Operation |
| Erase | 60h | D0h | Erase Operation |
| Read# | 00h | 0Ch | Do not care |
| Program# | 01h | 08h | Do not care |
| Erase# | 06h | 08h | Do not care |

MEMORY DEVICE REDUCING I/O SIGNAL LINES THROUGH I/O MAPPING CONNECTION AND MEMORY SYSTEM INCLUDING THE SAME

CROSS-REFERENCE TO RELATED APPLICATIONS

This application claims priority under 35 U.S.C. § 119 to Korean Patent Application No. 10-2023-0001537 filed on Jan. 5, 2023, in the Korean Intellectual Property Office, the disclosures of which are incorporated by reference herein in their entireties.

BACKGROUND

Example embodiments of the present disclosure described herein relate to memory devices having signal lines reduced through an input/output mapping connection and memory systems including the same.

A memory system may be an internal memory embedded in an electronic device. For example, the memory system may be a universal flash storage (UFS) or an embedded multi-media card (eMMC). The memory system may be an external memory detachable from the electronic device. For example, the memory system may include UFS memory card, Compact Flash (CF), Secure Digital (SD), Micro Secure Digital (Micro-SD), Mini Secure Digital (Mini-SD), extreme Digital (xD), or memory stick.

A memory device may include a plurality of memory chips. The memory device may include various types of memory chips. The memory device may include a nonvolatile memory chip and/or volatile memory chip. For example, the nonvolatile memory chip may be a vertical NAND flash memory chip. The volatile memory chip may be a dynamic random access memory (DRAM) chip such as DDR SDRAM (Double Data Rate Synchronous Dynamic Random Access Memory), LPDDR (Low Power Double Data Rate) SDRAM, GDDR (Graphics Double Data Rate) SDRAM, or RDRAM (Rambus Dynamic Random Access Memory), etc.

A plurality of memory chips may be mounted in the memory device in the form of a multi-chip package stacked on a package substrate. The memory device may include a plurality of signal lines for controlling and managing a plurality of memory chips. The plurality of signal lines may include control signal lines for selecting memory chips and input/output signals for transmitting data.

As the number of memory chips increases, the number of signal lines may increase. Accordingly, interconnection between the memory controller and the plurality of memory chips may become complicated. As the number of memory chips connected to one memory controller increases, the complicated interconnection may cause various problems, such as increased routing difficulty and signal delay.

SUMMARY

Example embodiments of the present disclosure provide memory devices capable of independently controlling each memory chip and at the same time simplifying interconnection between a memory controller and a plurality of memory chips.

Example embodiments of the present disclosure provide memory devices that reduce input/output signal lines and control signal lines between a memory controller and a plurality of memory chips.

According to some example embodiments, a memory device connected to a memory controller includes a first memory chip configured to receive input/output signals from the memory controller through first input/output pads; and a second memory chip having second input/output pads connected to the first input/output pads by a mapping connection. Wherein the second memory chip is configured to receive input/output signals different from the input/output signals provided to the first memory chip by the memory controller. Wherein the first and second memory chips are configured to selectively ignore the input/output signals provided by the memory controller based on the mapping connection.

According to some example embodiments, a memory device connected to a memory controller includes a first memory chip configured to receive input/output signals from the memory controller through first input/output pads; a second memory chip having second input/output pads normally connected to the first input/output pads; a third memory chip having third input/output pads mapped to the first input/output pads or the second input/output pads; and a fourth memory chip having fourth input/output pads normally connected to the third input/output pads. Wherein the third memory chip is configured to receive input/output signals different from the input/output signals provided by the memory controller to the first memory chip through a mapping connection. Wherein the third and fourth memory chips are configured to selectively ignore the input/output signals provided by the memory controller.

According to some example embodiments, a memory system includes a memory device including a package of a first memory chip configured to receive input/output signals through first input/output pads and a second memory chip having second input/output pads connected to the first input/output pads by a mapping connection; and a memory controller configured to provide the input/output signals to the memory device. Wherein the second memory chip is configured to receive input/output signals different from the input/output signals provided by the memory controller to the first memory chip based on the mapping connection. Wherein the first and second memory chips are configured to selectively ignore the input/output signals provided by the memory controller.

BRIEF DESCRIPTION OF THE FIGURES

The above and other objects and features of the present disclosure will become apparent by describing in detail example embodiments thereof with reference to the accompanying drawings.

FIG. 5 is a diagram illustrating some example embodiments of conditions of control signals for latching commands, addresses, and data of the memory device illustrated in FIG. 1.

FIG. 6 is a diagram illustrating command sets of the memory device illustrated in FIG. 1.

DETAILED DESCRIPTION

Below, example embodiments of the present disclosure will be described in detail and clearly to such an extent that one of ordinary skill in the art may easily implement the inventive concepts.

Figure 1:
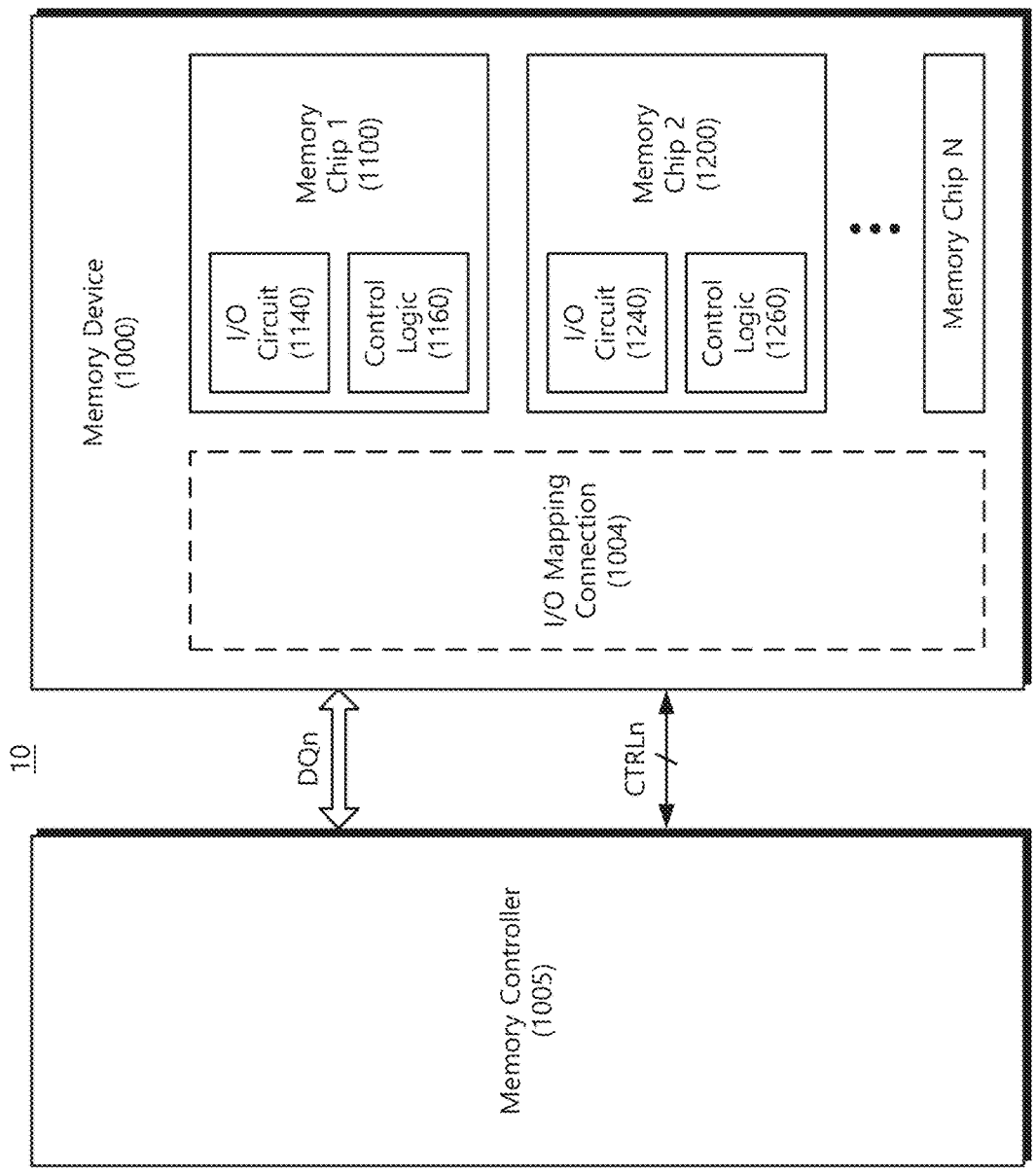
FIG. 1 is a block diagram illustrating a memory system according to example embodiments of the inventive concepts.

FIG. 1 is a block diagram illustrating a memory system according to example embodiments of the inventive concepts. Referring to FIG. 1, a memory system 10 may include a memory device 1000 and a memory controller 1005. The memory device 1000 may be connected to the memory controller 1005 through input/output signal lines and control signal lines.

The memory device 1000 may include a plurality of memory chips. For example, the memory device 1000 may be implemented as a multi-chip package such as a dual die package (DDP), quadruple die package (QDP), octuple die package (ODP), or high density package (HDP). When the memory device 1000 is implemented as a multi-chip package, the memory system 10 may support a chip enable reduction (CER) mode, and a chip address may be allocated to each memory chip.

Each memory chip may receive a chip enable signal and an address from the memory controller 1005. When the chip enable signal is in an enabled state (for example, at a low level), a memory chip having the same chip address as the received address may be selected. The selected memory chip may operate according to individual commands from the memory controller 1005.

The memory device 1000 may receive input/output signals DQn such as commands and addresses from the memory controller 1005 through input/output signal lines and may receive control signals CTRLn through control signal lines. Also, the memory device 1000 may transmit data to the memory controller 1005 through input/output signal lines. Each memory chip may have a unique identifier. The identifier of the memory chip may be used by the memory controller 1005 to access the memory chip, for example, the memory controller 1005 may use a specific identifier to access a specific memory chip.

The memory controller 1005 may be connected to a plurality of memory chips through an input/output mapping connection 1004. The memory controller 1005 may transmit an identifier of the first memory chip 1100 to input/output signal lines to access one memory chip (for example, the first memory chip 1100) among a plurality of memory chips. The first memory chip 1100 may perform a normal operation according to the control signals CTRLn of the memory controller 1005 when the identifier received through the input/output signal lines matches the identifier of the first memory chip 1100.

A method in which the memory controller 1005 accesses a plurality of memory chips using identifiers may reduce the number of control signal lines between the memory controller 1005 and the plurality of memory chips. That is, when the memory controller 1005 is connected to each of the memory chips through at least one independent control signal line (for example, chip enable CE #) to access the plurality of memory chips, each of the memory chips may be controlled independently.

Each memory chip may include input/output circuit and control logic. For example, the first memory chip 1100 may include an input/output circuit 1140 and a control logic 1160. The second memory chip 1200 may include an input/output circuit 1240 and a control logic 1260. Similarly, the n-th memory chip also may include an input/output circuit (not shown) and a control logic (not shown).

Figure 2:
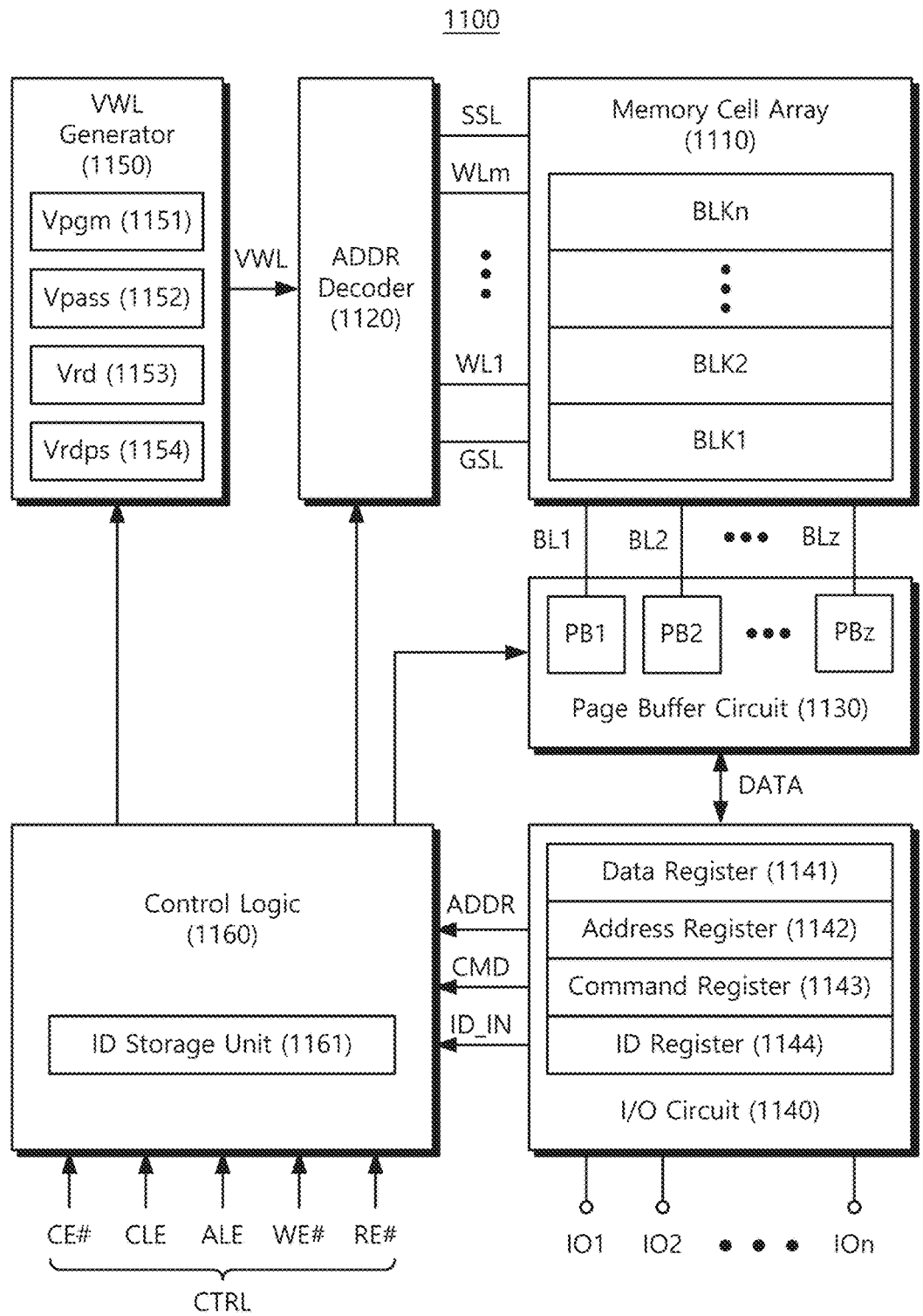
FIG. 2 is a block diagram illustrating some example embodiments of the first memory chip illustrated in FIG. 1.

FIG. 2 is a block diagram illustrating some example embodiments of the first memory chip illustrated in FIG. 1. The first memory chip 1100 may receive input signals through input/output signal lines and control signals (CE #, CLE, ALE, WE #, RE #, etc.) through a plurality of control signal lines.

Referring to FIG. 2, a first memory chip 1100 may include a memory cell array 1110, an address decoder 1120, a page buffer circuit 1130, an input/output circuit 1140, a word line voltage generator 1150, and a control logic 1160. The first memory chip 1100 may further include components not illustrated in FIG. 2.

The memory cell array 1110 may include a plurality of memory blocks BLK1 to BLKn. Each memory block may be composed of a plurality of pages. Each page may include a plurality of memory cells. Multi-bit data may be stored in each memory cell. Each memory block is an erase unit, and each page may be a read or write unit.

The memory cell array 1110 may include a plurality of memory blocks BLK1 to BLKn. Each memory block may be composed of a plurality of pages. Each page may include a plurality of memory cells. Multi-bit data may be stored in each memory cell. Each memory block is an erase unit, and each page may be a read or write unit.

The memory cell array 1110 may be formed in a direction perpendicular to a substrate. A gate electrode layer and an insulation layer may be alternately deposited on the substrate. Each memory block (for example, memory block BLK1) may be connected to one or more string selection lines SSL, a plurality of word lines WL1 to WLm, and one or more ground selection lines GSL.

The address decoder 1120 may be connected to the memory cell array 1110 through selection lines SSL and GSL and word lines WL1 to WLm. The address decoder 1120 may select a word line during a program or read operation. The address decoder 1120 may receive the word line voltage VWL from the word line voltage generator 1150 and provide a program voltage or read voltage to the selected word line.

The page buffer circuit 1130 may be connected to the memory cell array 1110 through bit lines BL1 to BLz. The page buffer circuit 1130 may temporarily store data to be stored in the memory cell array 1110 or data read from the memory cell array 1110. The page buffer circuit 1130 may include page buffers PB1 to PBz connected to respective bit lines. Each page buffer may include a plurality of latches to store or read multi-bit data.

The input/output circuit 1140 may be internally connected to the page buffer circuit 1130 through data lines and externally connected to the memory controller (such as the memory controller 1005 of FIG. 1) through the input/output lines IO1 to IOn. The input/output circuit 1140 may receive program data from the memory controller 1005 during a program operation. Also, the input/output circuit 1140 may provide data read from the memory cell array 1110 to the memory controller 1005 during a read operation.

The input/output circuit 1140 may receive or output signals through input/output signal lines based on the input/output signals I/O received from the control logic 1160. As illustrated in FIG. 2, the input/output circuit 1140 may include a plurality of registers 1141 to 1144. The input/output circuit 1140 may store received input signals in a data register 1141, an address register 1142, a command register 1143, and an identifier register 1144.

The word line voltage generator 1150 may receive internal power from the control logic 1160 and generate a word line voltage VWL required to read or write data. The word line voltage VWL may be provided to a selected word line (sWL) or unselected word lines (uWL) through the address decoder 1120.

The word line voltage generator 1150 may include a program voltage generator 1151 and a pass voltage generator 1152. The program voltage generator 1151 may generate a program voltage Vpgm provided to the selected word line sWL during a program operation. The pass voltage generator 1152 may generate a pass voltage Vpass provided to the selected word line sWL and the unselected word lines uWL.

The control logic 1160 may control operations such as read, write, and erase of the first memory chip 1100 using commands CMD, addresses ADDR, and control signals CTRL provided from the memory controller 1005. The addresses ADDR may include a block selection address for selecting one memory block, a row address for selecting one page, and a column address for selecting one memory cell.

The control logic 1160 may receive control signals CTRL. The control signals CTRL include chip enable (CE #), command latch enable (CLE), address latch enable (ALE), write enable (WE #), and read enable (RE #). The control logic 1160 may determine whether the control signals CTRL satisfy a plurality of predefined (or, alternatively, desired or selected) conditions. The control logic 1160 may control other components of the first memory chip 1100 according to conditions satisfied by the control signals CTRL.

The term # may denote an active low. Activation of the signal may occur during a low level. For example, when the chip enable CE # is in an inactive state at a high level, the first memory chip 1100 may not be selected. On the other hand, when the chip enable CE # is activated at a low level, the first memory chip 1100 may be selected.

The control logic 1160 may latch input signals received by the input/output circuit 1140 to one of a plurality of registers 1141 to 1144 by generating a latch enable based on a condition satisfied by the control signals CTRL. For example, the control logic 1160 may determine that the input signals received by the input/output circuit 1140 are the commands CMD when the control signals CTRL satisfy the first condition. The input signals may be latched into the command register 1143.

When the control signals CTRL satisfy the second condition, the control logic 1160 may determine that the input signals received by the input/output circuit 1140 are the addresses ADDR. The input signals may be latched into the address register 1142. The control logic 1160 may determine that the input signals received by the input/output circuit 1140 are data DATA when the control signals CTRL satisfy the third condition. The input signals may be latched into the data register 1141.

The control logic 1160 may include an identifier storage unit 1161. The identifier storage unit 1161 may store the unique identifier ID_IN of the first memory chip 1100. The unique identifier ID_IN may be a value used by the memory controller 1005 connected to the first memory chip 1100 to access the first memory chip 1100. An identifier storage unit 1161 included in each of a plurality of memory devices that share input/output signal lines and control signal lines may have different unique identifiers. The memory controller 1005 may select the first memory chip 1100 by transmitting an identifier identical to the unique identifier of the first memory chip 1100 to be accessed through the input/output signal lines.

The control logic 1160 may set the standby mode or cancel the standby mode by controlling elements included in the first memory chip 1100. For example, in the standby mode, the control logic 1160 may control the plurality of registers 1141 to 1144 not to latch input signals received through the input/output signal lines even if the control signals CTRL satisfy the first to third conditions. In addition, when the first memory chip 1100 enters the standby mode after being in the read mode, the read mode may be suspended. And the control logic 1160 may resume the read mode from a state at which the read mode was interrupted in response to the control signals CTRL and the received identifier matching the unique identifier.

Figure 3:
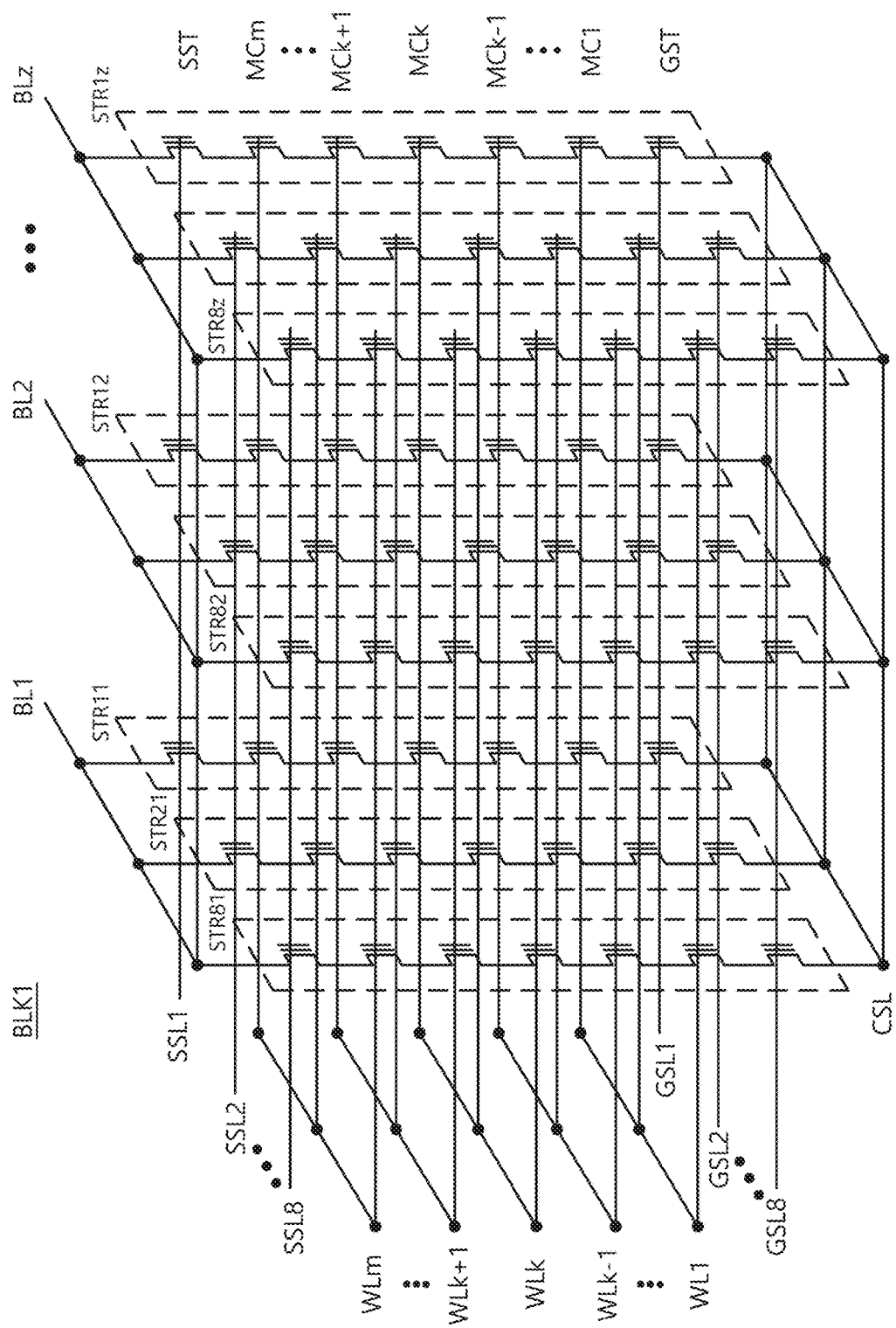
FIG. 3 is a circuit diagram illustrating some example embodiments of a memory block BLK1 of the memory cell array illustrated in FIG. 2.

FIG. 3 is a circuit diagram illustrating some example embodiments of a memory block BLK1 of the memory cell array illustrated in FIG. 2. Referring to FIG. 3, in the memory block BLK1, a plurality of cell strings STR11 to STR8z may be formed between the bit lines BL1 to BLz and a common source line CSL. Each cell string includes a string selection transistor SST, a plurality of memory cells MC1 to MCm, and a ground selection transistor GST.

The string selection transistors SST may be connected with string selection lines SSL1 to SSL8. The ground selection transistors GST may be connected with ground selection lines GSL1 to GSL8. The string selection transistors SST may be connected with the bit lines BL1 to BLz, and the ground selection transistors GST may be connected with the common source line CSL.

The first to m-th word lines WL1 to WLm may be connected with the plurality of memory cells MC1 to MCm in a row direction. The first to z-th bit lines BL1 to BLz may be connected with the plurality of memory cells MC1 to MCm in a column direction. First to z-th page buffers PB1 to PBz may be connected with the first to z-th bit lines BL1 to BLZ.

The first word line WL1 may be placed above the first to eighth ground selection lines GSL1 to GSL8. The first memory cells MC1 that are placed at the same height from the substrate may be connected with the first word line WL1. Likewise, the second to m-th memory cells MC2 to MCm that are placed at the same heights from the substrate may be respectively connected with the second to eighth word lines WL2 to WLm.

Figure 4:
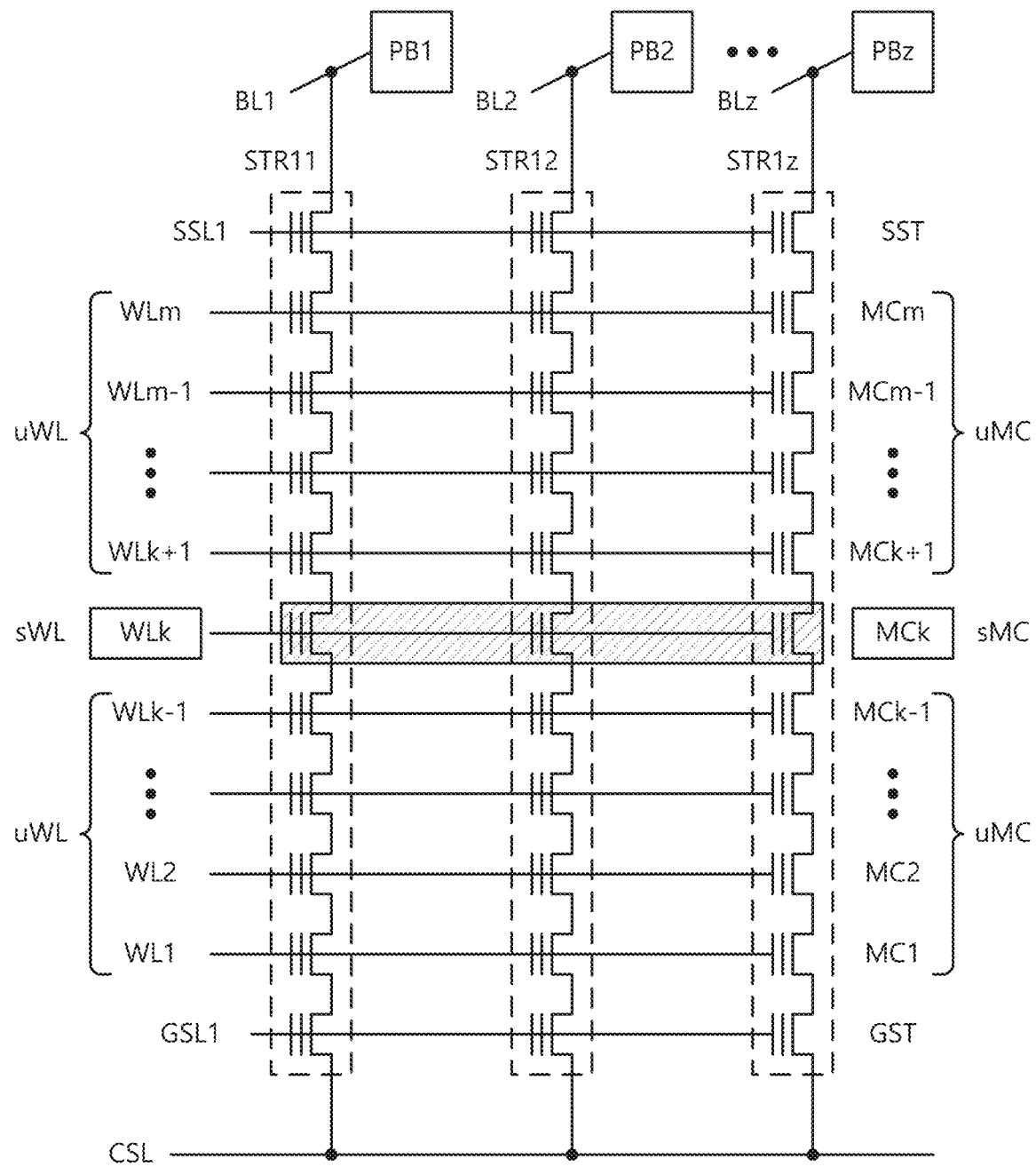
FIG. 4 is a circuit diagram illustrating cell strings selected by the first string selection line SSL1 from among the cell strings of the memory block BLK1 illustrated in FIG. 3.

FIG. 4 is a circuit diagram illustrating cell strings selected by the first string selection line SSL1 from among the cell strings of the memory block BLK1 illustrated in FIG. 3. The 1-1st to 1-zth cell strings STR11 to STR1z may be selected by the first string selection line SSL1. The 1-1st to 1-zth cell strings STR11 to STR1z may be connected to the first to z-th bit lines BL1 to BLz, respectively. The first to z-th page buffers PB1 to PBz may be connected to the first to z-th bit lines BL1 to BLz, respectively.

The 1-1st cell string STR11 may be connected to the first bit line BL1 and the common source line CSL. The 1-1st cell string STR11 may include string selection transistors SST selected by the first string selection line SSL1, first to m-th memory cells MC1 to MCm connected to the first to m-th word lines WL1 to WLm, and ground selection transistors GST selected by the first ground selection line GSL1. The twelfth cell string STR12 may be connected to the second bit line BL2 and the common source line CSL. The 1-zth cell string STR1z may be connected to the z-th bit line BLz and the common source line CSL.

The first word line WL1 and the m-th word line WLm may be edge word lines (edge WL). The second word line WL2 and the (m−1)-th word line WLm−1 may be edge adjacent word lines. The k-th word line WLk may be a selected word line sWL. The (k−1)-th word line WLk−1 and the (k+1)-th word line WLk+1 may be adjacent word lines adjacent to the selected word line. If the k-th word line WLk is the selected word line sWL, the remaining word lines WL1 to WLk−1 and WLk+1 to WLm may be unselected word lines uWL.

The first memory cells MC1 and the m-th memory cells MCm may be edge memory cells. The second memory cells MC2 and the (m−1)-th memory cells MCm−1 may be edge adjacent memory cells. The k-th memory cells MCK may be selected memory cells sMC. The (k−1)-th memory cells MCk−1 and the (k+1)-th memory cells MCk+1 may be memory cells adjacent to the selected memory cells (adjacent MC). If the k-th memory cells MCk are selected memory cells sMC, the remaining memory cells MC1 to MCk−1 and MCk+1 to MCm may be unselected memory cells uMC.

A set of memory cells selected by one string selection line and connected to one word line may be one page. For example, memory cells selected by the first string selection line SSL1 and connected to the k-th word line WLk may be one page. For example, eight pages may be configured on the k-th word line WLk. Among the eight pages, a page connected to the first string selection line SSL1 is a selected page, and pages connected to the second to eighth string selection lines SSL2 to SSL8 are unselected pages. However, other numbers of pages and/or ordering of pages may be used without departing from the inventive concepts.

FIG. 5 is a diagram illustrating some example embodiments of conditions of control signals for latching commands, addresses, and data of the memory device illustrated in FIG. 1. FIG. 5 illustrates first to third conditions that control signals must satisfy in order to latch commands, addresses, and data. FIG. 5 will be described with reference to FIG. 2.

When the chip enable CE # is at a high level, that is, in an inactive state, the first memory chip 1100 may be in a standby mode regardless of states of other control signals. In other words, the first memory chip 1100 may not, for example, react to or respond to, other signals. The first to third conditions may be conditions in which the chip enable CE # meets the low level.

In some example embodiments, a first condition for latching the command CMD is when the command latch enable (CLE) is at a high level, the address latch enable (ALE) is at a low level, and the read enable (RE #) is at a high level. As such, in some example embodiments, during the first condition, the write enable WE # transitions from a low level to a high level, a command may be latched in synchronization with a rising edge of the write enable WE #.

In some example embodiments, a second condition for latching the address ADDR is when the address latch enable ALE is at a high level, the command latch enable CLE is at a low level, and the read enable RE # is at a high level. As such, in some example embodiments, during the second condition, the write enable WE # transitions from a low level to a high level, the address may be latched in synchronization with a rising edge of the write enable WE #.

In some example embodiments, a third condition for latching the data DATA is when the command latch enable CLE and the address latch enable ALE are each at a low level and the read enable RE # is at a high level. As such, in some example embodiments, during the third condition, the write enable WE # transitions from a low level to a high level, data may be latched in synchronization with a rising edge of the write enable WE #.

FIG. 6 is a diagram illustrating command sets of the memory device illustrated in FIG. 1. Referring to FIG. 6, a plurality of memory chips may perform read, program, and erase operations according to a command set. The memory controller 1005 may provide a command set to a plurality of memory chips through input/output signal lines.

For example, the first memory chip 1100 may perform a read operation when 10h is input in the first cycle and 30h is input in the second cycle. An address may be input between the first and second cycles, and data may be output after the second cycle. The first memory chip 1100 may perform a program operation when D0h is input in the first cycle and 10h is input in the second cycle. An address may be input between the first and second cycles, and data may be programmed after the second cycle. The first memory chip 1100 may perform a block erase operation when 60h is input in the first cycle and D0h is input in the second cycle. A block address may be input between the first and second cycles, and an erase operation may be performed after the second cycle.

The first memory chip 1100 may receive an inverted command set from the memory controller 1005. In FIG. 6, Read # means an inverted read command set, Program # means an inverted program command set, and Erase # means an inverted erase command set. When the first memory chip 1100 receives an inverted command set, the first memory chip 1100 may ignore the inverted command set because it is not a prescribed (for example, expected, allowable, or determined) command set. That is, the first memory chip may not care, react, or respond to the inverted command set.

For example, when 00h is input in the first cycle and 0Ch is input in the second cycle, the first memory chip 1100 does not care about (for example, ignores, or does not register, react, or respond) the inverted read command set and does not perform a read operation. The first memory chip 1100 may not perform a program operation when 01h is input in the first cycle and 08h is input in the second cycle, as the first memory chip 1100 does not care about the inverted command. The first memory chip 1100 may not perform a block erase operation when 06h is input in the first cycle and 08h is input in the second cycle, as the first memory chip 1100 does not care about the inverted command.

Figure 7:
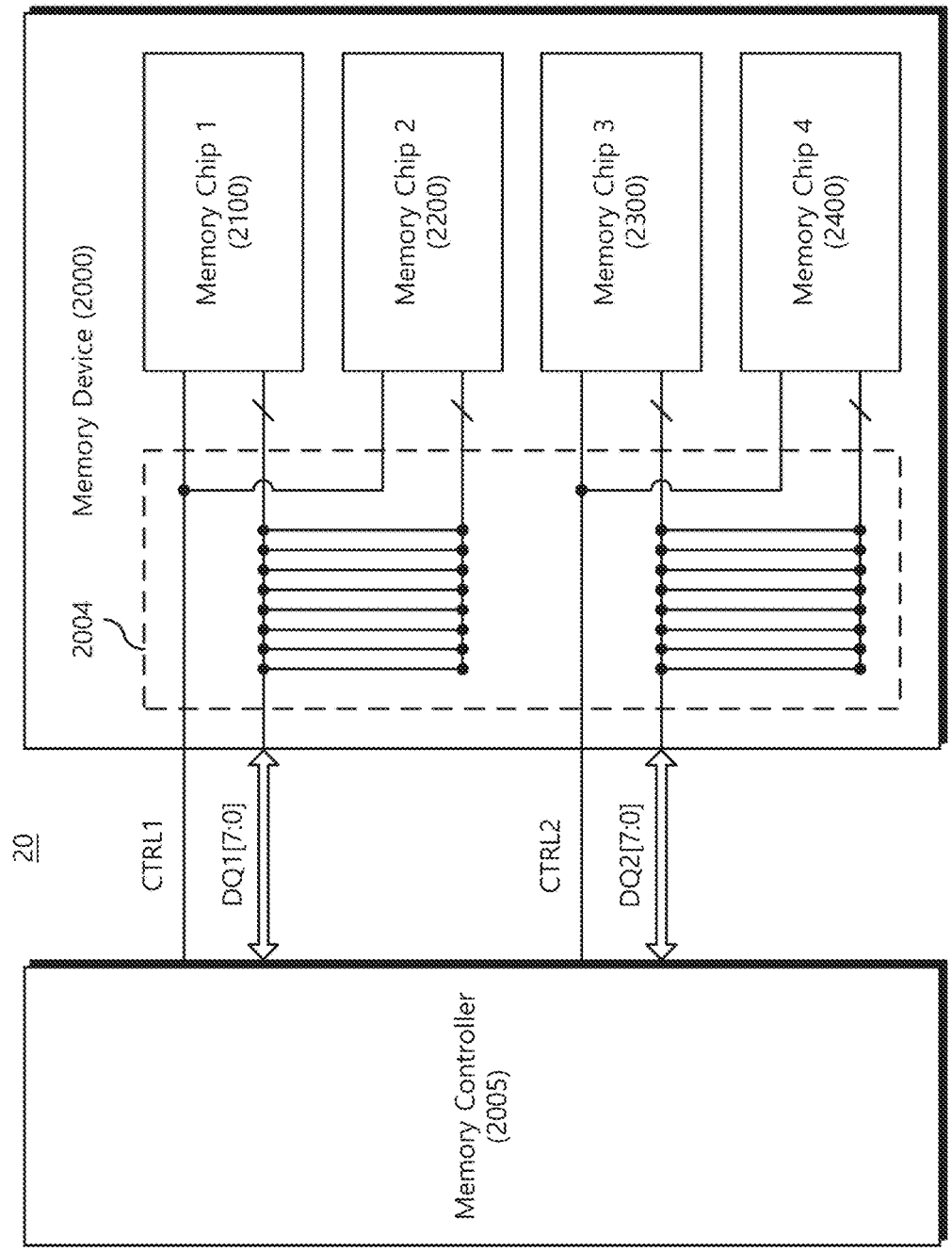
FIG. 7 is a block diagram illustrating some example embodiments of an input/output connection method of the memory device illustrated in FIG. 1.

FIG. 7 is a block diagram illustrating some example embodiments of an input/output connection method of the memory device illustrated in FIG. 1. Referring to FIG. 7, the memory system 70 may include a memory device 2000 and a memory controller 2005. The memory device 2000 may include first to fourth memory chips 2100 to 2400 and may be configured as a QDP.

The memory controller 2005 may provide the first control signals CTRL1 to the first and second memory chips 2100 and 2200 through the first control signal lines through the input/output connection method 2004, and the second control signal CTRL2 may be provided to the third and fourth memory chips 2300 and 2400 through the second control signal lines.

The first and second control signals CTRL1 and CTRL2 may include chip enable CE #, command latch enable CLE, address latch enable ALE, read enable RE #, and write enable WE #, etc. The memory controller 2005 may provide the first chip enable CE1 # to the first and second memory chips 2100 and 2200 through first control signal lines and provide the second chip enable CE2 # through second control signal lines. The memory controller 2005 may provide the second chip enable CE2 # to the third and fourth memory chips 2300 and 2400 through second control signal lines.

The first and second memory chips 2100 and 2200 may be connected to the memory controller 2005 through first input/output signal lines. The memory controller 2005 may provide first input/output signals DQ1[7:0] such as command, address, and data to the first memory chip 2100 or the second memory chip 2200 through the first input/output signal lines. The memory controller 2005 may provide second input/output signals DQ2[7:0] such as command, address, and data to the third memory chip 2300 or the fourth memory chip 2400 through the second input/output signal lines.

Figure 8:
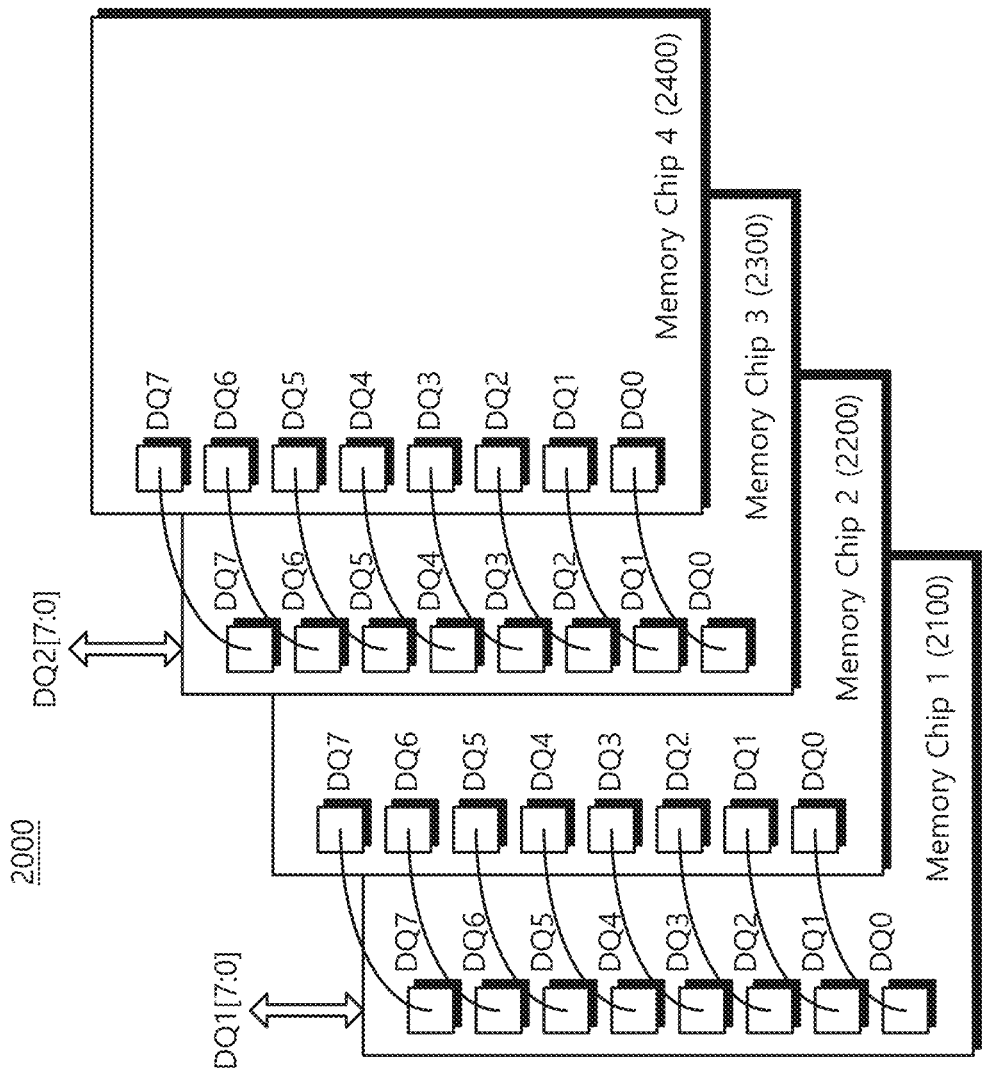
FIG. 8 is a package diagram illustrating some example embodiments of the input/output connection method of the memory device illustrated in FIG. 7.

FIG. 8 is a package diagram illustrating some example embodiments of the input/output connection method of the memory device illustrated in FIG. 7. Referring to FIG. 8, the memory device 2000 may be manufactured in a package in which first to fourth memory chips 2100 to 2400 are stacked.

The first and second memory chips 2100 and 2200 may share first input/output signal lines, and the third and fourth memory chips 2300 and 2400 may share second input/output signal lines. Although not illustrated in FIG. 8, the first control signals CTRL1 may be provided to the first or second memory chips 2100 and 2200 through the first control signal lines. The second control signals CTRL2 may be provided to the third or fourth memory chips 2300 and 2400 through the second control signal lines.

The first input/output signals DQ1[7:0] may be provided to pads DQ0 to DQ7 of the first memory chip 2100, respectively. Pads DQ0 to DQ7 of the first memory chip 2100 may be connected to pads DQ0 to DQ7 of the second memory chip 2200. The second input/output signals DQ2[7:0] may be provided to pads DQ0 to DQ7 of the third memory chip 2300, respectively. Pads DQ0 to DQ7 of the third memory chip 2300 may be connected to pads DQ0 to DQ7 of the fourth memory chip 2400.

Figure 9:
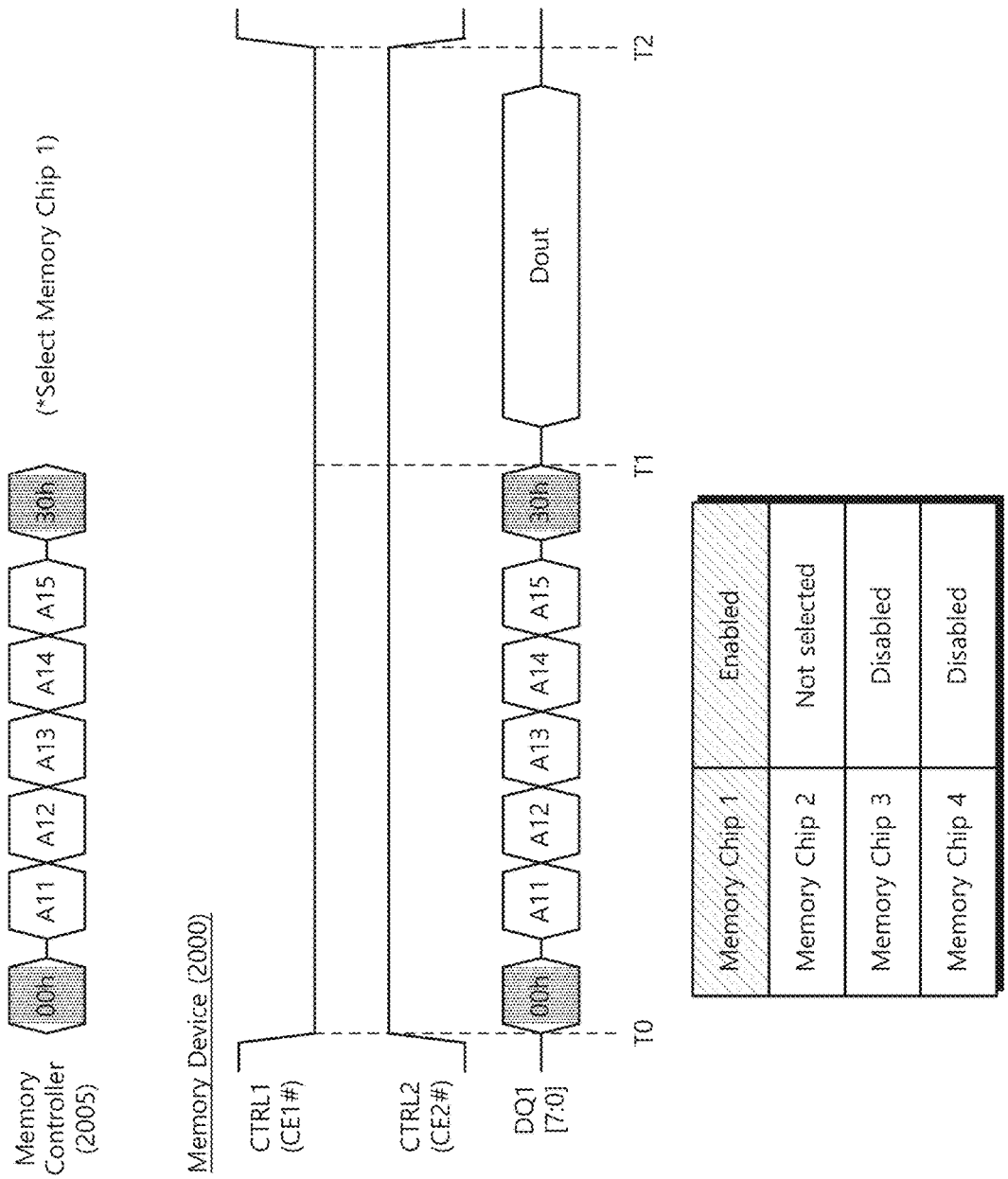
FIGS. 9 and 10 are timing diagrams illustrating some example embodiments of an operating method of the memory device illustrated in FIG. 7.
Figure 10:
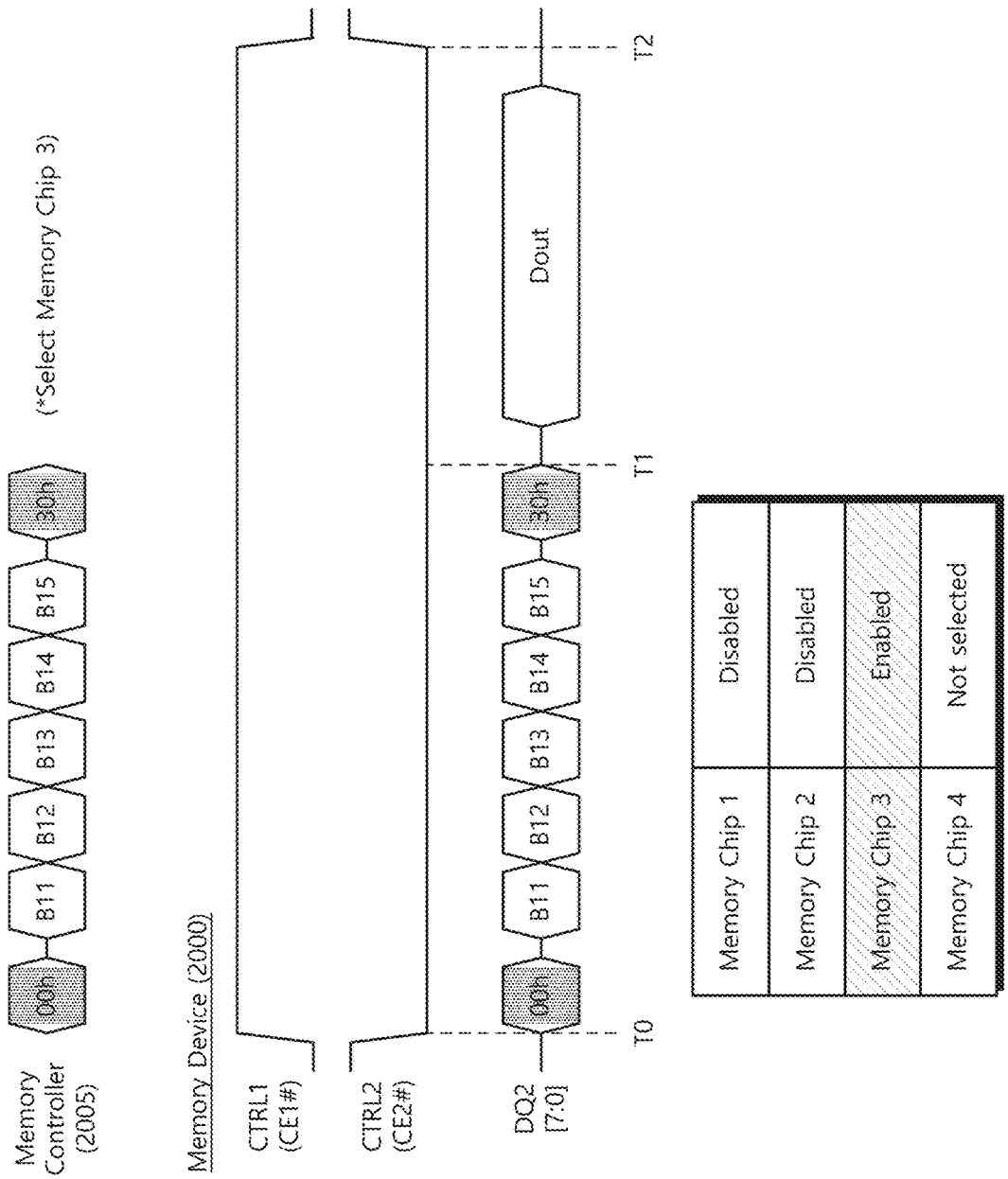

FIGS. 9 and 10 are timing diagrams illustrating some example embodiments of an operating method of the memory device illustrated in FIG. 7. Referring to FIGS. 9 and 10, the memory controller 2005 may provide the read command set (00h-30h) and read addresses (A11 to A15 and B11 to B15) illustrated in FIG. 6 to the memory device 2000.

Also, the memory controller 2005 may provide memory chip selection information to the memory device 2000. Memory chip selection information may be provided through the aforementioned identifier. For example, the memory controller 1005 may select the first memory chip 1100 by transmitting an identifier identical to the unique identifier of the first memory chip 1100 to be accessed through input/output signal lines.

Referring to FIG. 9, the memory controller 2005 may provide a read command set (00h to 30h), a read address (A11 to A15), and first memory chip selection information to the memory device 2000 according to first and second control signals CTRL1 and CTRL2. The first control signals CTRL1 may include a first chip enable CE1 #. The second control signals CTRL2 may include a second chip enable CE2 #.

The memory controller 2005 may provide the first chip enable CE1 # to the first and second memory chips 2100 and 2200 through first control signal lines. The memory controller 2005 may provide the second chip enable CE2 # to the third and fourth memory chips 2300 and 2400. The first chip enable CE #1 is in an enabled state, and the second chip enable CE #2 is in a disabled state.

In the period T0 to T2, the first chip enable CE1 # is at a low level and the second chip enable CE2 # is at a high level. The third and fourth memory chips 2300 and 2400 are disabled. A memory chip selected from among the first and second memory chips 2100 and 2200 may be enabled. In the example of FIG. 9, the first memory chip 2100 is enabled, and the unselected second memory chip 2200 is not enabled.

In the period from T0 to T1, the first memory chip 2100 may receive 00h read command according to the first condition, receive read addresses (A11 to A15) according to the second condition, and receive 30h confirm command according to the first condition. The memory chip 2100 may output data Dout stored in read addresses (A11 to A15) in a period T1 to T2.

Referring to FIG. 10, the memory controller 2005 transmits read command set (00h-30h), read addresses (B11 to B15), and third memory chip selection information to the memory device 2000 according to first and second control signals CTRL1 and CTRL2. The first chip enable CE #1 is in a disabled state with a high level, and the second chip enable CE #2 is in an enabled state with a low level.

In the period from T0 to T2, the first and second memory chips 2100 and 2200 are disabled. A memory chip selected from among the third and fourth memory chips 2300 and 2400 may be enabled. In the example of FIG. 10, the third memory chip 2300 is enabled, and the unselected fourth memory chip 2400 is not enabled.

In the period from T0 to T1, the third memory chip 2300 may receive 00h read command according to the first condition, receive read addresses (B11 to B15) according to the second condition, and receive 30h confirm command according to the first condition. The third memory chip 2300 may output data Dout stored in read addresses (B11 to B15) in the period T1 to T2.

Figure 11:
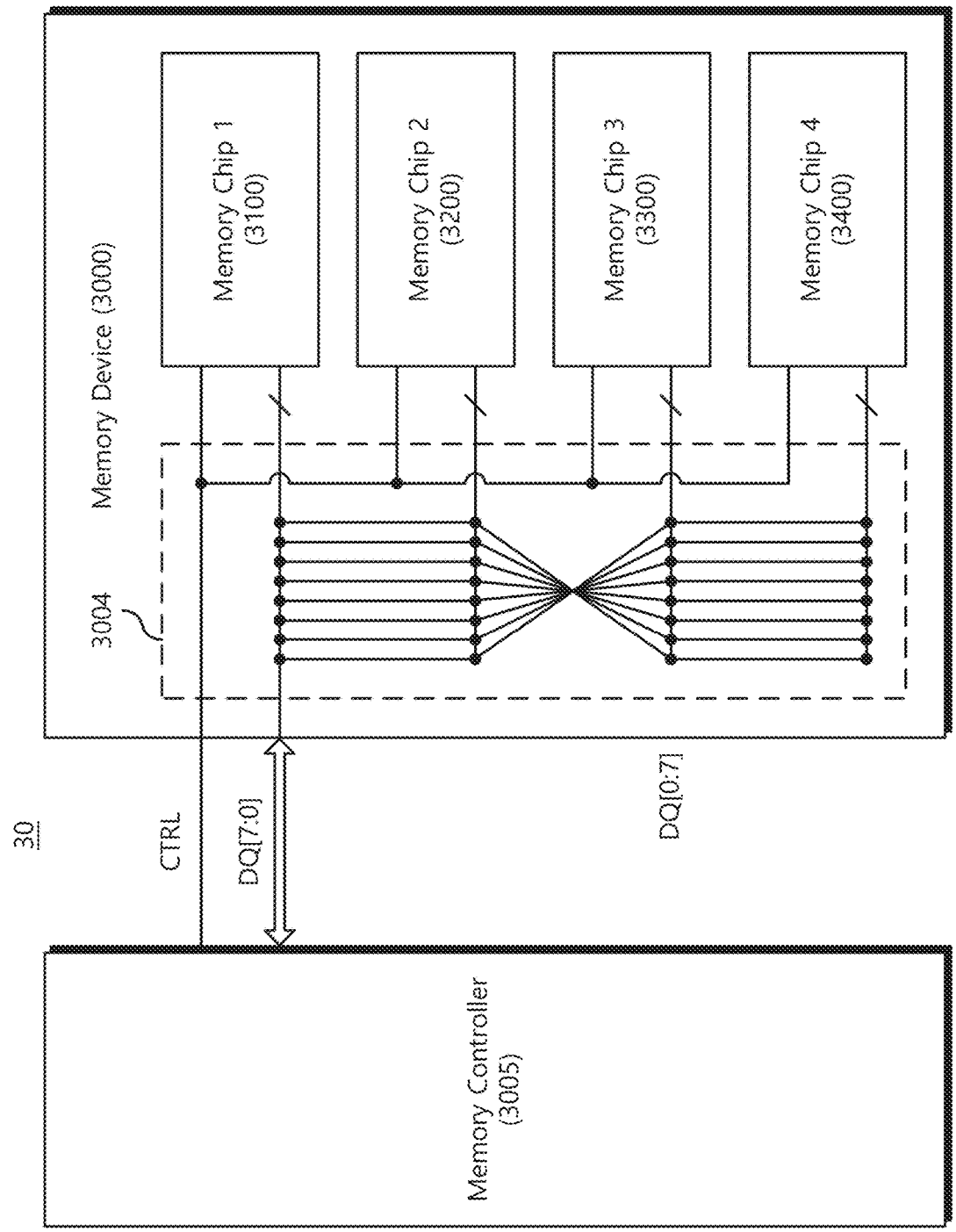
FIG. 11 is a block diagram illustrating a method for connecting input/output mapping of a memory device according to example embodiments of the present disclosure.

FIG. 11 is a block diagram illustrating a method for connecting input/output mapping of a memory device according to example embodiments of the present disclosure. Referring to FIG. 11, the memory system 11 may include a memory device 3000 and a memory controller 3005. The memory device 3000 may include first to fourth memory chips 3100 to 3400 and may be configured as a QDP.

Hereinafter, the input/output connection method illustrated in FIG. 11 is referred to as a mapping connection, and the input/output connection method illustrated in FIG. 7 is referred to as a normal connection.

Referring to the input/output mapping connection 3004 of FIG. 11, the memory controller 3005 may provide control signals CTRL to the first to fourth memory chips 3100 to 3400 through control signal lines. Control signals CTRL may include chip enable CE #, command latch enable CLE, address latch enable ALE, read enable RE #, write enable WE #, and the like. The memory controller 3005 may provide chip enable CE # to the first to fourth memory chips 3100 to 3400.

The first to fourth memory chips 3100 to 3400 may be connected to the memory controller 3005 through one input/output signal lines. The memory controller 3005 may provide input/output signals (DQ[7:0]) such as command, address, and data to the memory device 3500 through input/output signal lines. According to the input/output mapping connection 3004 illustrated in FIG. 11, DQ[7:0] may be input to the first and second memory chips 3100 and 3200. DQ[0:7] may be input to the third and fourth memory chips 3300 and 3400.

Figure 12:
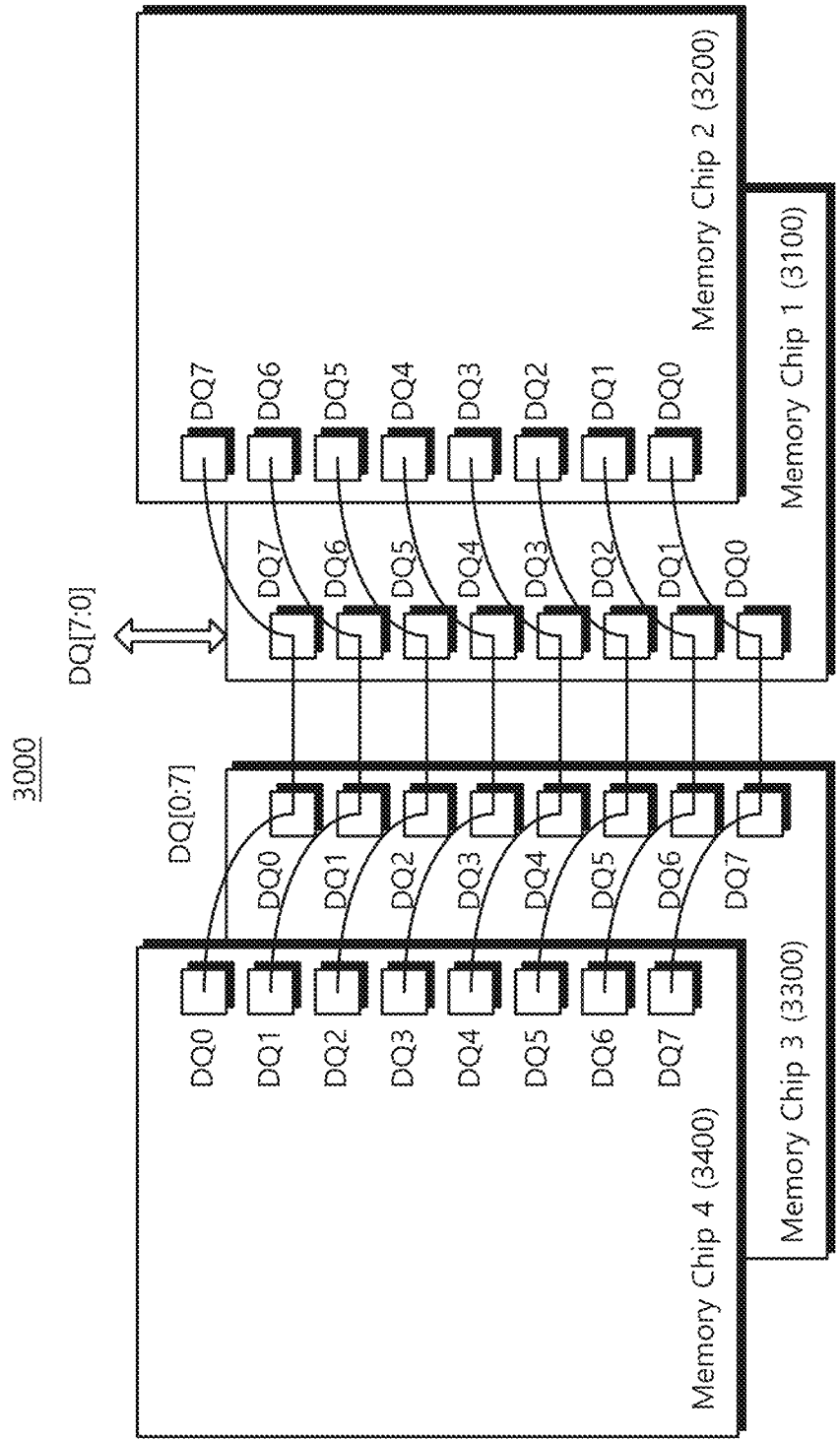
FIG. 12 is a package diagram illustrating some example embodiments of the input/output connection method of the memory device illustrated in FIG. 11.

FIG. 12 is a package diagram illustrating some example embodiments of the input/output connection method of the memory device illustrated in FIG. 11. Referring to FIG. 12, the memory device 3000 may be manufactured in a package in which first and second memory chips 3100 and 3200 are stacked, and third and fourth memory chips 3300 and 3400 are stacked.

The second memory chip 3200 is stacked on the first memory chip 3100. The fourth memory chip 3400 is stacked on the third memory chip 3300. The first and second memory chips 3100 and 3200 may be manufactured in a package form facing the third and fourth memory chips 3300 and 3400, however, example embodiments of the inventive concepts are not limited thereto.

The first memory chip 3100 may be connected to the memory controller 3005 through input/output signal lines. The second to fourth memory chips 3200 to 3400 may share input/output signal lines. The input/output signals DQ[7:0] may be connected to pads DQ0 to DQ7 of the first memory chip 3100. Pads DQ0 to DQ7 of the first memory chip 3100 may be sequentially connected to pads DQ0 to DQ7 of the second memory chip 3200.

Pads DQ0 to DQ7 of the first memory chip 3100 may be connected to pads DQ7 to DQ0 of the third memory chip 3300. The DQ0 pad of the first memory chip 3100 may be connected to the DQ7 pad of the third memory chip 3300. The DQ1 pad of the first memory chip 3100 may be connected to the DQ6 pad of the third memory chip 3300. Similarly, the DQ7 pad of the first memory chip 3100 may be connected to the DQ0 pad of the third memory chip 3300. Pads DQ7 to DQ0 of the third memory chip 3300 may be sequentially connected to pads DQ7 to DQ0 of the fourth memory chip 3400. That is, the pads DQ0 to DQ7 of the first memory chip 3100 may be mapped to the reverse order of the pads DQ0 to DQ7 of the third memory chip 3300.

Figure 13:
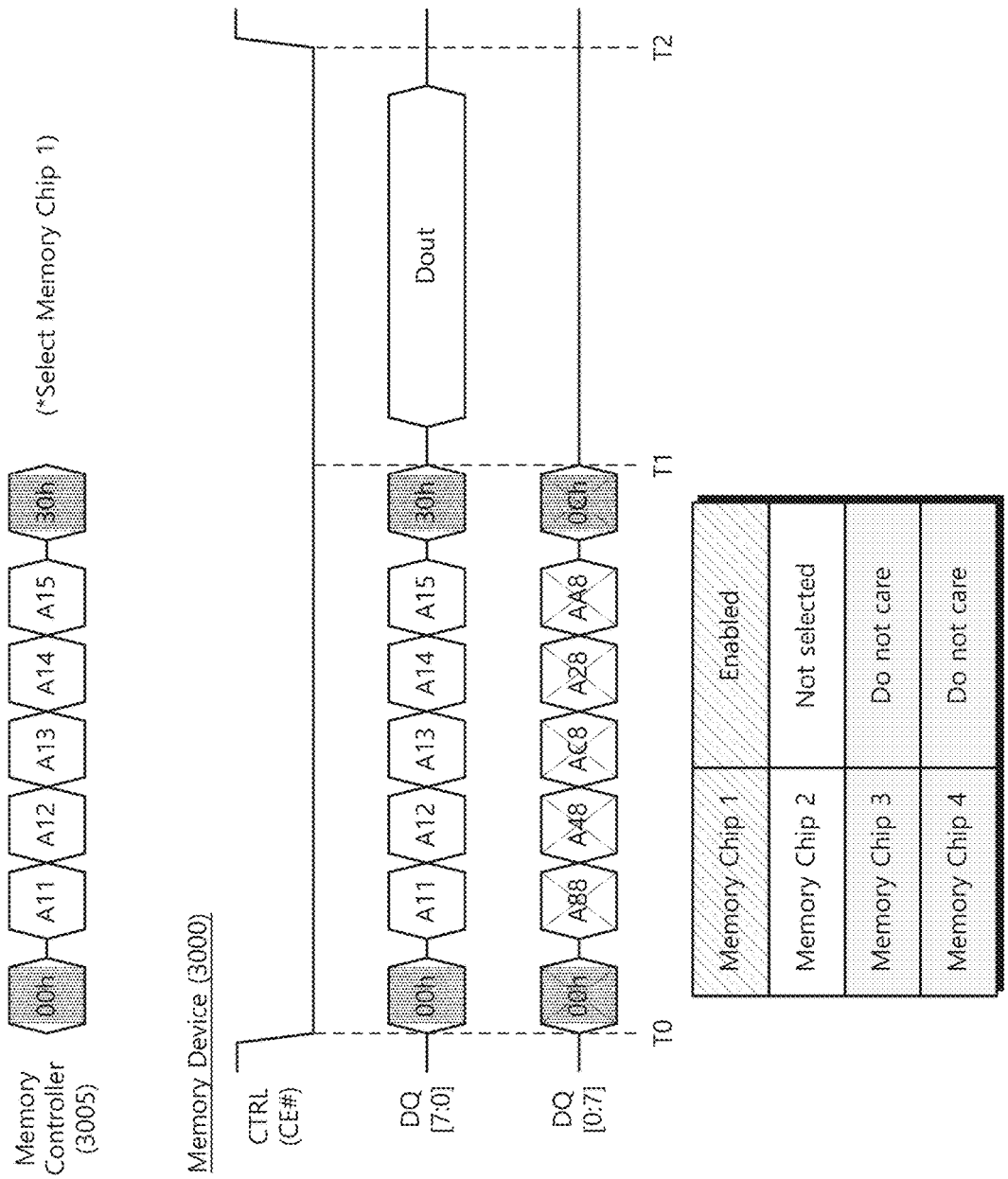
FIGS. 13 and 14 are timing diagrams illustrating some example embodiments of an operating method of the memory device illustrated in FIG. 11.
Figure 14:
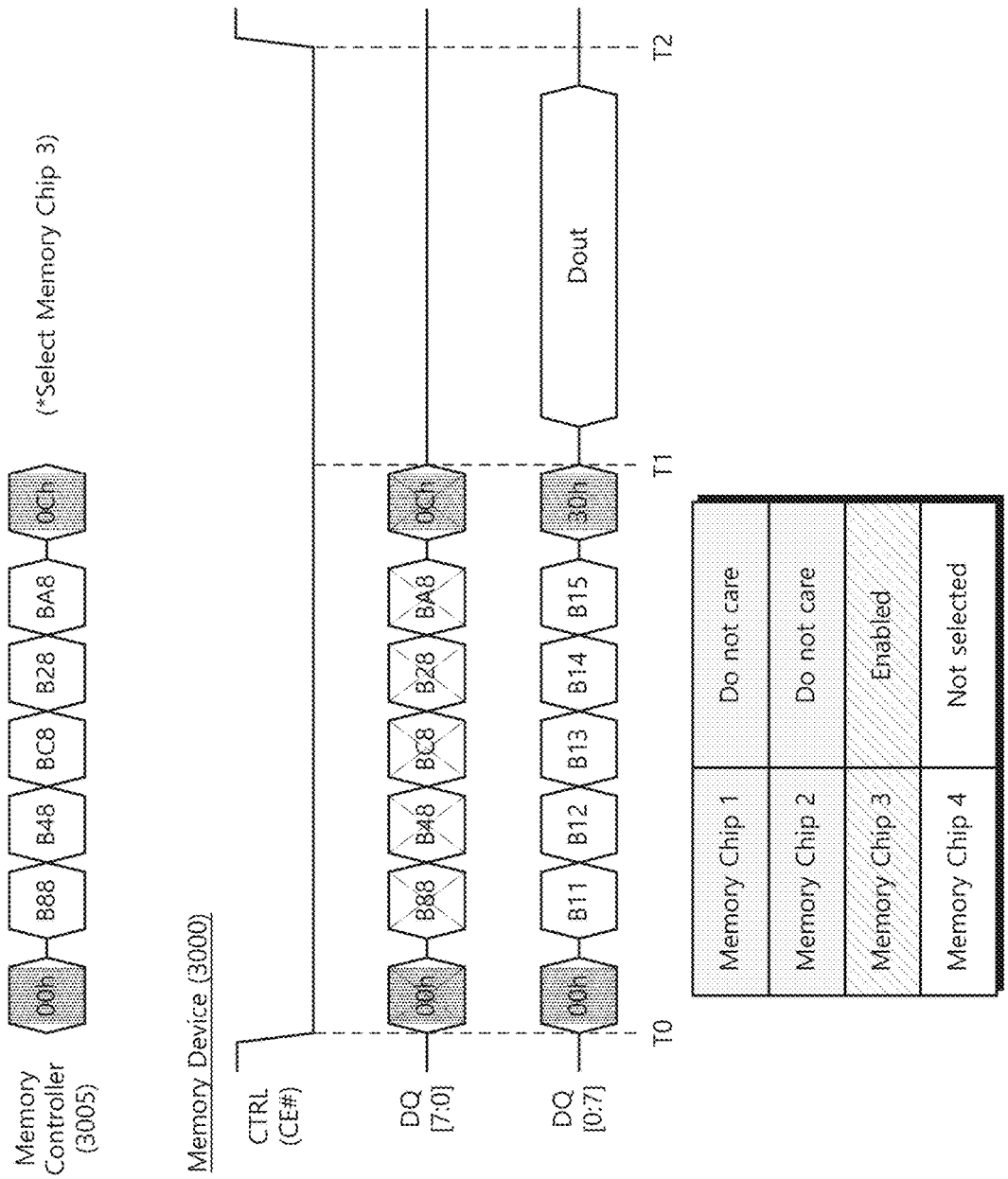

FIGS. 13 and 14 are timing diagrams illustrating some example embodiments of an operating method of the memory device illustrated in FIG. 11. Referring to FIGS. 13 and 14, the memory controller 3005 may provide the read command set (00$h$-30$h$) and read addresses (A11 to A15 and B11 to B15) illustrated in FIG. 6 to the memory device 3000. Also, the memory controller 3005 may provide memory chip selection information to the memory device 3000.

Referring to FIG. 13, The memory controller 3005 may provide read command sets (00$h$ to 30$h$), read addresses (A11 to A15), and first memory chip selection information to the memory device 3000 according to control signals CTRL. Control signals CTRL may include chip enable CE #. The memory controller 3005 may provide chip enable CE # to the first to fourth memory chips 3100 to 3400 through control signal lines. Chip enable CE # is in an enabled state.

In the period T0 to T2, the chip enable CE # is at a low level. The first memory chip 3100 may receive the 00$h$ read command according to the first condition in the period T0 to T1, receive read addresses (A11 to A15) according to the second condition, and receive the 30$h$ confirm command according to the first condition. The first memory chip 3100 may output data Dout in the period T1 to T2.

The second memory chip 3200 is not enabled because it is an unselected memory chip. Regardless of the memory chip selection information, the third and fourth memory chips 3300 and 3400 may be ignored because the normal command set illustrated in FIG. 6 is not input.

The third and fourth memory chips 3300 and 3400 may receive the 00$h$ read command according to the first condition, receive read addresses (A88, A48, AC8, A28, and AA8) according to the second condition, and the 0Ch confirm command according to the third condition through the input/output mapping connection 3004 illustrated in FIG. 11 in the period T0 to T1.

Since the read command set input to the third and fourth memory chips 3300 and 3400 is changed to 00$h$-0Ch through the input/output mapping connection 3004, the read operation may be ignored. In addition, read addresses input to the third and fourth memory chips 3300 and 3400 are also ignored because they are not real addresses, and data is not output in period T1 to T2.

The third and fourth memory chips 3300 and 3400 receive read addresses (A88, A48, AC8, A28, and AA8). The read addresses may be different from the addresses provided by the memory controller 3005 due to the input/output mapping connection 3004. The read addresses may be ignored. And, as such, data may be not output in the period T1 to T2.

Referring to FIG. 14, the memory controller 3005 may provide an inverted read command set (00$h$-0Ch), an inverted read addresses (B88, B48, BC8, B28, BA8), and third memory chip selection information to the memory device 3000 according to control signals CTRL. Control signals CTRL may include chip enable CE #.

In the period T0 to T2, the chip enable CE # is at a low level. The inverted command set may be ignored in the first and second memory chips 3100 and 3200. The first and second memory chips 3100 and 3200 may receive the 00$h$ read command according to the first condition, receive read addresses (B88, B48, BC8, B28, BA8) according to the second condition, and the 0Ch confirm command according to the third condition in the period T0 to T1.

Since the read command set input to the first and second memory chips 3100 and 3200 is 00$h$-0Ch, the read operation may be ignored. In addition, the first and second memory chips 3100 and 3200 receive read addresses (B88, B48, BC8, B28, BA8). The read addresses may be different from the addresses provided by the memory controller 3005. The read addresses may be ignored. And, as such, data may be not output in the period T1 to T2.

Due to the input/output mapping connection 3004 illustrated in FIG. 11, the third memory chip 3300 may receive the 00$h$ read command according to the first condition, the read addresses (B11 to B15) according to the second condition, and the 30$h$ confirm command in the period T0 to T1.

The third memory chip 3300 may output data in the period T1 to T2. The fourth memory chip 3400 is not enabled because it is an unselected memory chip.

According to the input/output mapping connection method of the memory device 3000 illustrated in FIG. 11, the memory controller 3005 may connect the first to fourth memory chips 3100 to 3400 through one control signal lines and one input/output signal lines. Compared to the input/output normal connection method illustrated in FIG. 7, the input/output mapping connection method illustrated in FIG. 11 may reduce control signal lines and input/output signal lines by simply changing the connection method. As described above, there may be an effect of reducing a footprint of the memory device 1000 by reducing and/or improving signal lines Alternatively or additionally, as described above, because of the improved signal line design, there may be an effect of saving power consumption, improved device size and/or portability, and other benefits.

Figure 15:
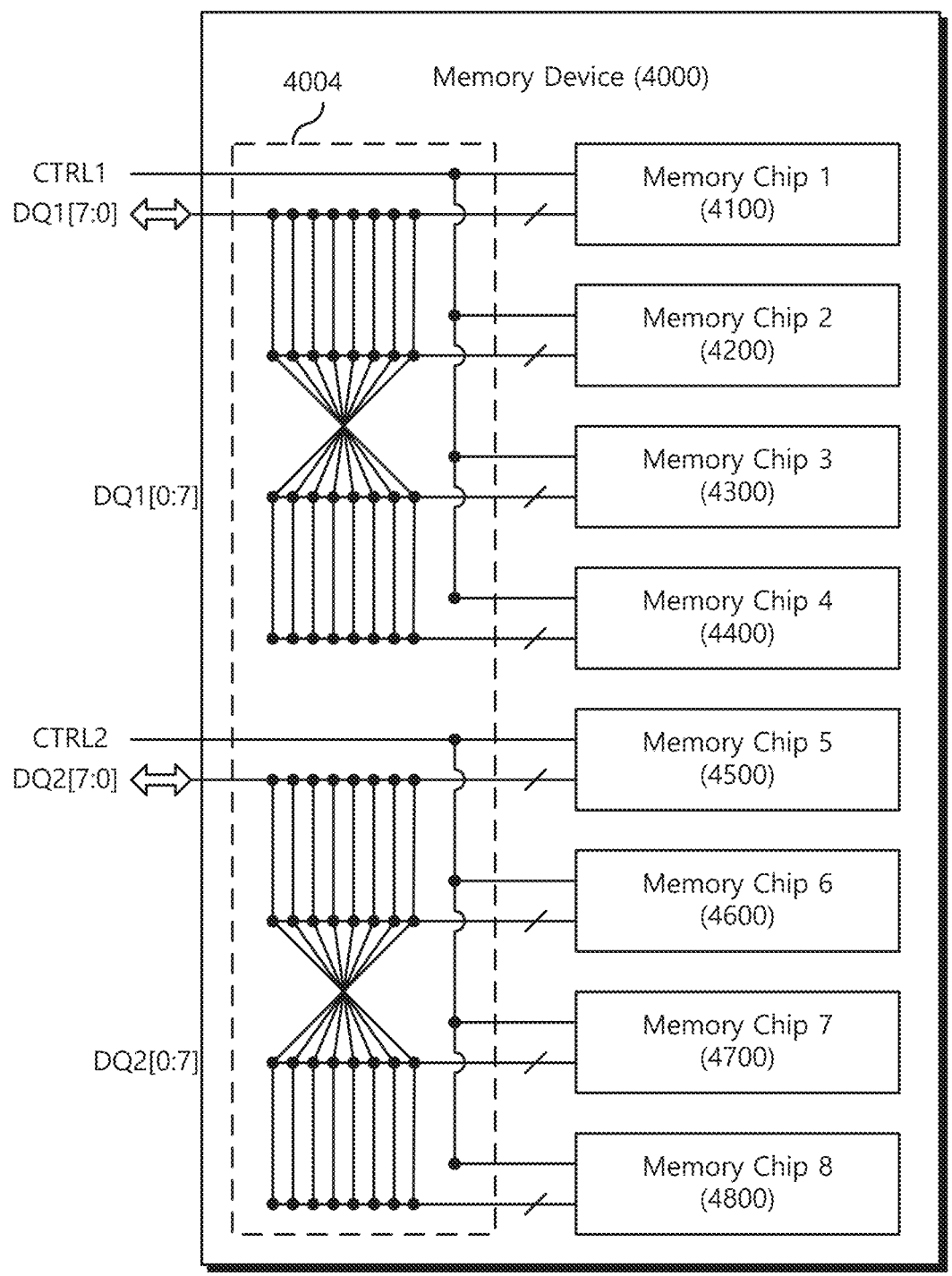
FIGS. 15 and 16 are block diagrams illustrating some example embodiments of an input/output mapping connection method of a memory device according to the present disclosure.
Figure 16:
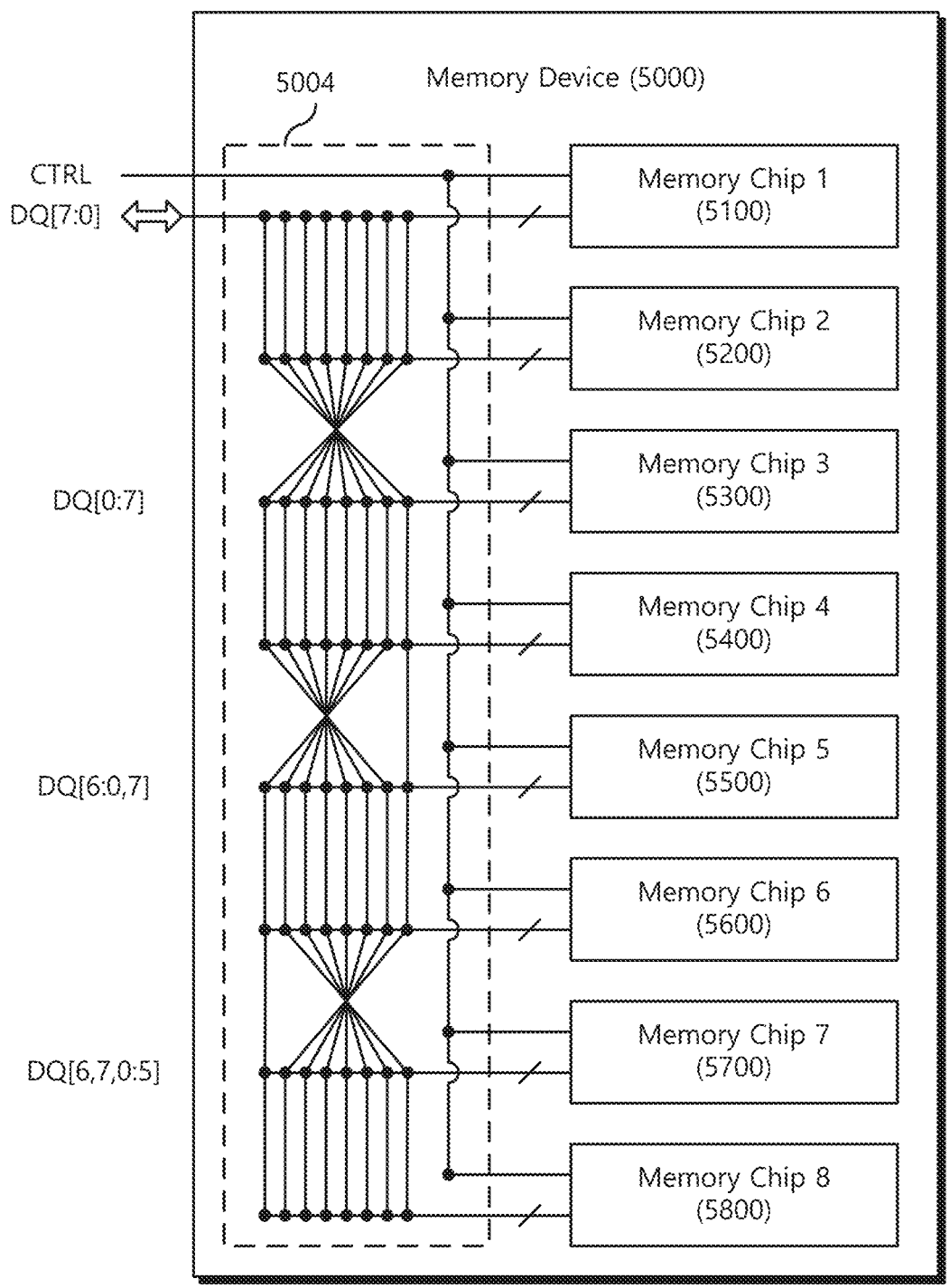

FIGS. 15 and 16 are block diagrams illustrating some example embodiments of an input/output mapping connection method of a memory device according to the present disclosure. FIGS. 15 and 16 are some example embodiments of extension to ODP. Referring to FIG. 15, a memory device 4000 may include first to eighth memory chips 4100 to 4800. The first and second control signals CTRL1 and CTRL2 and the first and second input/output signals DQ1[7:0] and DQ2[7:0] may be provided to the first to eighth memory chips 4100 to 4800 through the input/output mapping connection 4004.

The first control signals CTRL1 may be provided to the first to fourth memory chips 4100 to 4400. The second control signals CTRL2 may be provided to the fifth to eighth memory chips 4500 to 4800. The first input/output signals DQ1[7:0] may be provided to the first to fourth memory chips 4100 to 4400. The second input/output signals DQ2[7:0] may be provided to the fifth to eighth memory chips 4500 to 4800.

The first to fourth memory chips 4100 to 4400 may share first input/output signal lines. The first input/output signals DQ1[7:0] may be connected to pads DQ0 to DQ7 of the first memory chip 4100, respectively. Pads DQ0 to DQ7 of the first memory chip 4100 may be connected to pads DQ0 to DQ7 of the second memory chip 4200.

Pads DQ0 to DQ7 of the second memory chip 4200 may be connected to pads DQ7 to DQ0 of the third memory chip 4300. The DQ0 pad of the second memory chip 4200 may be connected to the DQ7 pad of the third memory chip 4300. The DQ1 pad of the second memory chip 4200 may be connected to the DQ6 pad of the third memory chip 4300. Similarly, the DQ7 pad of the second memory chip 4200 may be connected to the DQ0 pad of the third memory chip 4300. Pads DQ7 to DQ0 of the third memory chip 4300 may be connected to pads DQ7 to DQ0 of the fourth memory chip 4400.

The fifth to eighth memory chips 4500 to 4800 may share the second input/output signal lines. The second input/output signals DQ2[7:0] may be connected to pads DQ0 to DQ7 of the fifth memory chip 4500, respectively. Pads DQ0 to DQ7 of the fifth memory chip 4500 may be connected to pads DQ0 to DQ7 of the sixth memory chip 4600.

Pads DQ0 to DQ7 of the sixth memory chip 4600 may be connected to pads DQ7 to DQ0 of the seventh memory chip 4700. The DQ0 pad of the sixth memory chip 4600 may be connected to the DQ7 pad of the seventh memory chip 4700. The DQ1 pad of the sixth memory chip 4600 may be connected to the DQ6 pad of the seventh memory chip 4700. Similarly, the DQ7 pad of the sixth memory chip 4600 may be connected to the DQ0 pad of the seventh memory chip 4700. Pads DQ7 to DQ0 of the seventh memory chip 4700 may be connected to pads DQ7 to DQ0 of the eighth memory chip 4800.

According to the input/output mapping connection method of the memory device 4000 illustrated in FIG. 15, the memory controller may control the first to eighth memory chips 5100 to 5800 through two control signal lines and two input/output signal lines. According to the present disclosure, control signal lines and input/output signal lines may be reduced.

Referring to FIG. 16, a memory device 5000 may include first to eighth memory chips 5100 to 5800. The control signals CTRL and the input/output signals DQ[7:0] may be provided to the first to eighth memory chips 5100 to 5800 through the input/output mapping connection 5004. The first to eighth memory chips 5100 to 5800 may share input/output signal lines. The input/output signal lines may be connected to pads DQ0 to DQ7 of the first memory chip 5100. Pads DQ0 to DQ7 of the first memory chip 5100 may be connected to pads DQ0 to DQ7 of the second memory chip 5200.

Pads DQ0 to DQ7 of the second memory chip 5200 may be connected to pads DQ7 to DQ0 of the third memory chip 5300. The DQ0 pad of the second memory chip 5200 may be connected to the DQ7 pad of the third memory chip 5300. The DQ1 pad of the second memory chip 5200 may be connected to the DQ6 pad of the third memory chip 5300. Similarly, the DQ7 pad of the second memory chip 5200 may be connected to the DQ0 pad of the third memory chip 5300.

Pads DQ7 to DQ0 of the third memory chip 5300 may be connected to pads DQ7 to DQ0 of the fourth memory chip 5400. Pads DQ7 to DQ0 of the fourth memory chip 5400 may be connected to pads DQ7 and DQ0 to DQ6 of the fifth memory chip 5500. Pad DQ7 and pads DQ0 to DQ6 of the fifth memory chip 5500 may be connected to pads DQ7 and DQ0 to DQ6 of the sixth memory chip 5600. Pads DQ7 and DQ0 to DQ6 of the sixth memory chip 5600 may be connected to pads DQ5 to DQ0, DQ7 and DQ6 of the seventh memory chip 5700. Pads DQ5 to DQ0, DQ7, and DQ6 of the seventh memory chip 5700 may be connected to pads DQ5 to DQ0, DQ7, and DQ6 of the eighth memory chip 5800.

Pads DQ0 to DQ7 of the sixth memory chip 5600 may be connected to pads DQ0 and DQ7 to DQ1 of the seventh memory chip 5700. The DQ0 pad of the sixth memory chip 5600 may be connected to the DQ0 pad of the seventh memory chip 5700. The DQ1 pad of the sixth memory chip 5600 may be connected to the DQ7 pad of the seventh memory chip 5700. Similarly, the DQ7 pad of the sixth memory chip 5600 may be connected to the DQ1 pad of the seventh memory chip 5700. Pads DQ7 to DQ0 of the seventh memory chip 5700 may be connected to pads DQ7 to DQ0 of the eighth memory chip 5800.

According to the input/output mapping connection method of the memory device 5000 illustrated in FIG. 16, the memory controller may control the first to eighth memory chips 5100 to 5800 through one control signal lines and one input/output signal lines. According to the present disclosure, control signal lines and input/output signal lines may be reduced.

Figure 17:
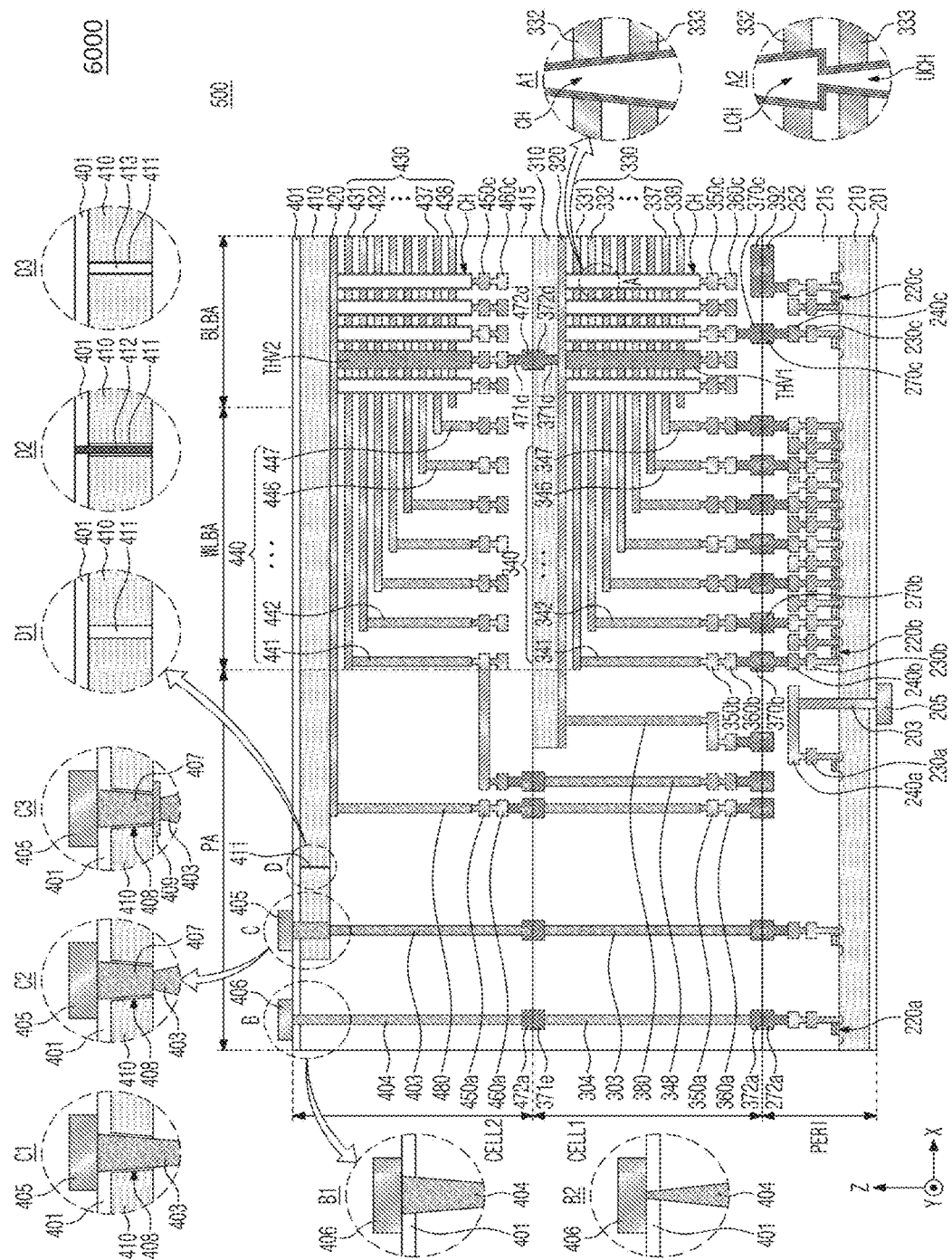
FIG. 17 is a view illustrating a memory device according to some example embodiments of the present disclosure.

FIG. 17 is a view illustrating a memory device according to some example embodiments of the present disclosure.

Referring to FIG. 17, the memory device 6000 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 6000 may include the at least one upper chip including the cell region. For example, the memory device 6000 may include two upper chips. However, the number of the upper chips is not limited thereto. In the case in which the memory device 6000 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 6000. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction. However, example embodiments of the inventive concepts are not limited thereto. In some example embodiments, one of the first upper chip and the second upper chip may be turned over and then may be connected to a corresponding chip by the bonding method.

Each of the peripheral circuit region PERI and the first and second cell regions CELL1 and CELL2 of the memory device 6000 may include an external pad bonding region PA, a word line bonding region WLBA, and a bit line bonding region BLBA.

The peripheral circuit region PERI may include a first substrate 210 and a plurality of circuit elements 220a, 220b and 220c formed on the first substrate 210. An interlayer insulating layer 215 including one or more insulating layers may be provided on the plurality of circuit elements 220a, 220b and 220c, and a plurality of metal lines electrically connected to the plurality of circuit elements 220a, 220b and 220c may be provided in the interlayer insulating layer 215. For example, the plurality of metal lines may include first metal lines 230a, 230b and 230c connected to the plurality of circuit elements 220a, 220b and 220c, and second metal lines 240a, 240b and 240c formed on the first metal lines 230a, 230b and 230c. The plurality of metal lines may be formed of at least one of various conductive materials. For example, the first metal lines 230a, 230b and 230c may be formed of tungsten having a relatively high electrical resistivity, and the second metal lines 240a, 240b and 240c may be formed of copper having a relatively low electrical resistivity.

The first metal lines 230a, 230b and 230c and the second metal lines 240a, 240b and 240c are illustrated and described in some example embodiments. However, example embodiments of the inventive concepts are not limited thereto. In some example embodiments, at least one or more additional metal lines may further be formed on the second metal lines 240a, 240b and 240c. In this case, the second metal lines 240a, 240b and 240c may be formed of aluminum, and at least some of the additional metal lines formed on the second metal lines 240a, 240b and 240c may be formed of copper having an electrical resistivity lower than that of aluminum of the second metal lines 240a, 240b and 240c.

The interlayer insulating layer 215 may be disposed on the first substrate 210 and may include an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 to 338) may be stacked on the second substrate 310 in a direction (for example, the Z-axis direction) perpendicular to a top surface of the second substrate 310. String selection lines and a ground selection line may be disposed on and under the word lines 330, and the plurality of word lines 330 may be disposed between the string selection lines and the ground selection line. Likewise, the second cell region CELL2 may include a third substrate 410 and a common source line 420, and a plurality of word lines 430 (431 to 438) may be stacked on the third substrate 410 in a direction (for example, the Z-axis direction) perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some example embodiments, as illustrated in a region 'A1', the channel structure CH may be provided in the bit line bonding region BLBA and may extend in the direction perpendicular to the top surface of the second substrate 310 to penetrate the word lines 330, the string selection lines, and the ground selection line. The channel structure CH may include a data storage layer, a channel layer, and a filling insulation layer. The channel layer may be electrically connected to a first metal line 350c and a second metal line 360c in the bit line bonding region BLBA. For example, the second metal line 360c may be a bit line and may be connected to the channel structure CH through the first metal line 350c. The bit line 360c may extend in a first direction (for example, a Y-axis direction) parallel to the top surface of the second substrate 310.

In some example embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 310 to penetrate the common source line 320 and lower word lines 331 and 332. The lower channel LCH may include a data storage layer, a channel layer, and a filling insulation layer and may be connected to the upper channel UCH. The upper channel UCH may penetrate upper word lines 333 to 338. The upper channel UCH may include a data storage layer, a channel layer, and a filling insulation layer, and the channel layer of the upper channel UCH may be electrically connected to the first metal line 350c and the second metal line 360c. As a length of a channel increases, due to characteristics of manufacturing processes, it may be difficult to form a channel having a substantially uniform or uniform width. The memory device 6000 according to some example embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 332 and 333 adjacent to the boundary between the lower channel LCH and the upper channel UCH may be the dummy word lines. In this case, data may not be stored in memory cells connected to the dummy word line. Alternatively, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 331 and 332 penetrated by the lower channel LCH is less than the number of the upper word lines 333 to 338 penetrated by the upper channel UCH in the region 'A2'. However, example embodiments of the inventive concepts are not limited thereto. In some example embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same or the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. The first through-electrode THV1 may penetrate the common source line 320 and the plurality of word lines 330. In some example embodiments, the first through-electrode THV1 may further penetrate the second substrate 310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some example embodiments, the first through-electrode THV1 and the second through-electrode THV2 may be electrically connected to each other through a first through-metal pattern 372d and a second through-metal pattern 472d. The first through-metal pattern 372d may be formed at a bottom end of the first upper chip including the first cell region CELL1, and the second through-metal pattern 472d may be formed at a top end of the second upper chip including the second cell region CELL2. The first through-electrode THV1 may be electrically connected to the first metal line 350c and the second metal line 360c. A lower via 371d may be formed between the first through-electrode THV1 and the first through-metal pattern 372d, and an upper via 471d may be formed between the second through-electrode THV2 and the second through-metal pattern 472d. The first through-metal pattern 372d and the second through-metal pattern 472d may be connected to each other by the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit line bonding region BLBA, the bit line 360c may be electrically connected to a page buffer included in the peripheral circuit region PERI. For example, some of the circuit elements 220c of the peripheral circuit region PERI may constitute the page buffer, and the bit line 360c may be electrically connected to the circuit elements 220c constituting the page buffer through an upper bonding metal pattern 370c of the first cell region CELL1 and an upper bonding metal pattern 270c of the peripheral circuit region PERI.

In the word line bonding region WLBA, the word lines 330 of the first cell region CELL1 may extend in a second direction (for example, an X-axis direction) parallel to the top surface of the second substrate 310 and may be connected to a plurality of cell contact plugs 340 (341 to 347). First metal lines 350b and second metal lines 360b may be sequentially connected onto the cell contact plugs 340 connected to the word lines 330. In the word line bonding region WLBA, the cell contact plugs 340 may be connected to the peripheral circuit region PERI through upper bonding metal patterns 370b of the first cell region CELL1 and upper bonding metal patterns 270b of the peripheral circuit region PERI.

The cell contact plugs 340 may be electrically connected to a row decoder included in the peripheral circuit region PERI. For example, some of the circuit elements 220b of the peripheral circuit region PERI may constitute the row decoder, and the cell contact plugs 340 may be electrically connected to the circuit elements 220b constituting the row decoder through the upper bonding metal patterns 370b of the first cell region CELL1 and the upper bonding metal patterns 270b of the peripheral circuit region PERI. In some example embodiments, an operating voltage of the circuit elements 220b constituting the row decoder may be different from an operating voltage of the circuit elements 220c constituting the page buffer. For example, the operating voltage of the circuit elements 220c constituting the page buffer may be greater than the operating voltage of the circuit elements 220b constituting the row decoder.

Likewise, in the word line bonding region WLBA, the word lines 430 of the second cell region CELL2 may extend in the second direction (for example, the X-axis direction) parallel to the top surface of the third substrate 410 and may be connected to a plurality of cell contact plugs 440 (441 to 447). The cell contact plugs 440 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 370b may be formed in the first cell region CELL1, and the upper bonding metal patterns 270b may be formed in the peripheral circuit region PERI. The upper bonding metal patterns 370b of the first cell region CELL1 and the upper bonding metal patterns 270b of the peripheral circuit region PERI may be electrically connected to each other by the bonding method. The upper bonding metal patterns 370b and the upper bonding metal patterns 270b may be formed of aluminum, copper, or tungsten.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected to each other by the bonding method in the external pad bonding region PA. Likewise, an upper metal pattern 372a may be formed in an upper portion of the first cell region CELL1, and an upper metal pattern 272a may be formed in an upper portion of the peripheral circuit region PERI. The upper metal pattern 372a of the first cell region CELL1 and the upper metal pattern 272a of the peripheral circuit region PERI may be connected to each other by the bonding method.

Common source line contact plugs 380 and 480 may be disposed in the external pad bonding region PA. The common source line contact plugs 380 and 480 may be formed of a conductive material such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405 and 406 may be disposed in the external pad bonding region PA. A lower insulating layer 201 may cover a bottom surface of the first substrate 210, and a first input/output pad 205 may be formed on the lower insulating layer 201. The first input/output pad 205 may be connected to at least one of a plurality of the circuit elements 220a disposed in the peripheral circuit region PERI through a first input/output contact plug 203 and may be separated from the first substrate 210 by the lower insulating layer 201. In addition, a side insulating layer may be disposed between the first input/output contact plug 203 and the first substrate 210 to electrically isolate the first input/output contact plug 203 from the first substrate 210.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220a disposed in the peripheral circuit region PERI through second input/output contact plugs 403 and 303, and the third input/output pad 406 may be connected to at least one of the plurality of circuit elements 220a disposed in the peripheral circuit region PERI through third input/output contact plugs 404 and 304.

In some example embodiments, the third substrate 410 may not be disposed in a region in which the input/output contact plug is disposed. For example, as illustrated in a region 'B', the third input/output contact plug 404 may be separated from the third substrate 410 in a direction parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In some example embodiments, as illustrated in a region 'B1', the third input/output contact plug 404 may extend in a third direction (for example, the Z-axis direction), and a diameter of the third input/output contact plug 404 may become progressively greater toward the upper insulating layer 401. In other words, a diameter of the channel structure CH described in the region 'A1' may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In some example embodiments, as illustrated in a region 'B2', the third input/output contact plug 404 may extend in the third direction (for example, the Z-axis direction), and a diameter of the third input/output contact plug 404 may become progressively less toward the upper insulating layer 401. In other words, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In some example embodiments, the input/output contact plug may overlap with the third substrate 410. For example, as illustrated in a region 'C', the second input/output contact plug 403 may penetrate the interlayer insulating layer 415 of the second cell region CELL2 in the third direction (for example, the Z-axis direction) and may be electrically connected to the second input/output pad 405 through the third substrate 410. In this case, a connection structure of the second input/output contact plug 403 and the second input/output pad 405 may be realized by various methods.

In some example embodiments, as illustrated in a region 'C1', an opening 408 may be formed to penetrate the third substrate 410, and the second input/output contact plug 403 may be connected directly to the second input/output pad 405 through the opening 408 formed in the third substrate 410. In this case, as illustrated in the region 'C1', a diameter of the second input/output contact plug 403 may become progressively greater toward the second input/output pad 405. However, example embodiments of the inventive concepts are not limited thereto, and in some example embodiments, the diameter of the second input/output contact plug 403 may become progressively less toward the second input/output pad 405.

In some example embodiments, as illustrated in a region 'C2', the opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Thus, the second input/output contact plug 403 may be electrically connected to the second input/output pad 405 through the contact 407 in the opening 408. In this case, as illustrated in the region 'C2', a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In some example embodiments illustrated in a region 'C3', a stopper 409 may further be formed on a bottom end of the opening 408 of the third substrate 410, as compared with some example embodiments of the region 'C2'. The stopper 409 may be a metal line formed in the same layer as the common source line 420. Alternatively, the stopper 409 may be a metal line formed in the same layer as at least one of the word lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371e or may become progressively greater toward the lower metal pattern 371e.

Meanwhile, in some example embodiments, a slit 411 may be formed in the third substrate 410. For example, the slit 411 may be formed at a some example position of the external pad bonding region PA. For example, as illustrated in a region 'D', the slit 411 may be located between the second input/output pad 405 and the cell contact plugs 440 when viewed in a plan view. Alternatively, the second input/output pad 405 may be located between the slit 411 and the cell contact plugs 440 when viewed in a plan view.

In some example embodiments, as illustrated in a region 'D1', the slit 411 may be formed to penetrate the third substrate 410. For example, the slit 411 may be used to prevent or reduce the third substrate 410 from being finely cracked when the opening 408 is formed. However, example embodiments of the inventive concepts are not limited thereto, and in some example embodiments, the slit 411 may be formed to have a depth ranging from about or exactly 60% to about or exactly 70% of a thickness of the third substrate 410.

In some example embodiments, as illustrated in a region 'D2', a conductive material 412 may be formed in the slit 411. For example, the conductive material 412 may be used to discharge a leakage current occurring in driving of the circuit elements in the external pad bonding region PA to the outside. In this case, the conductive material 412 may be connected to an external ground line.

In some example embodiments, as illustrated in a region 'D3', an insulating material 413 may be formed in the slit 411. For example, the insulating material 413 may be used to electrically isolate the second input/output pad 405 and the second input/output contact plug 403 disposed in the external pad bonding region PA from the word line bonding region WLBA. Since the insulating material 413 is formed in the slit 411, it is possible to prevent or reduce a voltage provided through the second input/output pad 405 from affecting a metal layer disposed on the third substrate 410 in the word line bonding region WLBA.

Meanwhile, in some example embodiments, the first to third input/output pads 205, 405 and 406 may be selectively formed. For example, the memory device 6000 may be realized to include only the first input/output pad 205 disposed on the first substrate 210, to include only the second input/output pad 405 disposed on the third substrate 410, or to include only the third input/output pad 406 disposed on the upper insulating layer 401.

In some example embodiments, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering a top surface of the common source line 320 or a conductive layer for connection may be formed. Likewise, the third substrate 410 of the second cell region CELL2 may be removed before or after the bonding process of the first cell region CELL1 and the second cell region CELL2, and then, the upper insulating layer 401 covering a top surface of the common source line 420 or a conductive layer for connection may be formed.

When the terms "about" or "substantially" are used in this specification in connection with a numerical value, it is intended that the associated numerical value includes a manufacturing or operational tolerance (e.g., +10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., +10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (for example, a memory), for example a DRAM device, storing a program of instructions, and a processor (for example, CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. A memory device connected to a memory controller comprising:

a first memory chip configured to receive input/output signals from the memory controller through first input/output pads; and a second memory chip having second input/output pads connected to the first input/output pads based on a mapping connection, the second memory chip configured to receive input/output signals different from the input/output signals provided to the first memory chip by the memory controller, and the first and second memory chips are configured to selectively ignore the input/output signals provided by the memory controller based on a control signal received by the first memory chip and the second memory chip.

2. The memory device of claim 1, wherein the first memory chip is configured to receive a command set and addresses from the memory controller through the first input/output pads and perform a normal operation.

3. The memory device of claim 2,
wherein the second memory chip is configured to ignore input/output signals received from the memory controller based on receiving the command set and the addresses being inverted through the second input/output pads.

4. The memory device of claim 1,
wherein the first memory chip is configured to ignore input/output signals received from the memory controller based on receiving an inverted command set and inverted addresses from the memory controller through the first input/output pads.

5. The memory device of claim 4,
wherein the second memory chip is configured to
receive a command set and addresses based on the inverted command set and the inverted addresses being inverted through the second input/output pads and
perform a normal operation.

6. A memory device connected to a memory controller comprising:
a first memory chip configured to receive input/output signals from the memory controller through first input/output pads;
a second memory chip having second input/output pads normally connected to the first input/output pads;
a third memory chip having third input/output pads mapped to the first input/output pads or the second input/output pads; and
a fourth memory chip having fourth input/output pads normally connected to the third input/output pads;
the third memory chip being configured to receive input/output signals different from the input/output signals provided by the memory controller to the first memory chip through a mapping connection, and
the third and fourth memory chips are configured to selectively ignore the input/output signals provided by the memory controller based on a control signal being received by the first memory chip, the second memory chip, the third memory chip, and the fourth memory chip.

7. The memory device of claim 6,
wherein the memory controller is configured to provide selection information to the memory device.

8. The memory device of claim 7,
wherein the first memory chip is configured to
receive a command set and addresses from the memory controller through the first input/output pads and perform a normal operation according to a selection information.

9. The memory device of claim 8,
wherein the second memory chip is configured to not perform the normal operation according to the selection information.

10. The memory device of claim 7,
wherein the third memory chip is configured to ignore input/output signals received from the memory controller based on receiving a command set and addresses being inverted through the third input/output pads.

11. The memory device of claim 7,
wherein the first memory chip is configured to ignore input/output signals received from the memory controller based on receiving an inverted command set and inverted addresses from the memory controller through the first input/output pads.

12. The memory device of claim 11,
wherein the second memory chip is configured to ignore the input/output signals based on receiving the inverted command set and the inverted addresses through the second input/output pads.

13. The memory device of claim 12,
wherein the third memory chip is configured to
receive a command set and addresses based on the inverted command set and the inverted addresses being inverted through the third input/output pads, and
perform a normal operation according to the selection information.

14. The memory device of claim 13,
wherein the fourth memory chip is configured to not perform the normal operation according to the selection information.

15. The memory device of claim 6,
wherein the first to fourth memory chips are flash memories.

16. A memory system comprising:
a memory device including a package of a first memory chip configured to receive input/output signals through first input/output pads and a second memory chip having second input/output pads connected to the first input/output pads based on a mapping connection; and
a memory controller configured to provide the input/output signals to the memory device,
the second memory chip being configured to receive input/output signals different from the input/output signals provided by the memory controller to the first memory chip based on the mapping connection, and
the first and second memory chips are configured to selectively ignore the input/output signals provided by the memory controller based on a control signal received by the first memory chip and the second memory chip.

17. The memory system of claim 16,
wherein the first memory chip is configured to receive a command set and addresses from the memory controller through the first input/output pads and perform a normal operation.

18. The memory system of claim 17,
wherein the second memory chip is configured to ignore the input/output signals received from the memory controller based on receiving the command set and the inverted addresses being inverted through the second input/output pads.

19. The memory system of claim 16,
wherein the first memory chip is configured to ignore the input/output signals received from the memory controller based on receiving an inverted command set and inverted addresses from the memory controller through the first input/output pads.

20. The memory system of claim 19,
wherein the second memory chip is configured to
  receive a command set and addresses based on the inverted command set and the inverted addresses being inverted through the second input/output pads and
  perform a normal operation.

* * * * *